US009819719B2

United States Patent
Hasson et al.

(10) Patent No.: US 9,819,719 B2
(45) Date of Patent: Nov. 14, 2017

(54) METHOD FOR PARSING NETWORK MESSAGE AND COMMUNICATION DEVICE

(71) Applicant: Huawei Technologies Co., Ltd., Shenzhen (CN)

(72) Inventors: Uri Hasson, Munich (DE); Amit Kristal, Shenzhen (CN); Mo Mo, Shenzhen (CN); Jian Huang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 484 days.

(21) Appl. No.: 14/292,086

(22) Filed: May 30, 2014

(65) Prior Publication Data

US 2014/0280924 A1 Sep. 18, 2014

Related U.S. Application Data

(63) Continuation of application No. PCT/CN2012/085494, filed on Nov. 29, 2012.

(30) Foreign Application Priority Data

Nov. 30, 2011 (CN) .......................... 2011 1 0389258

(51) Int. Cl.
*H04L 29/08* (2006.01)
*H04L 29/06* (2006.01)
*H04L 12/58* (2006.01)

(52) U.S. Cl.
CPC ............ *H04L 67/02* (2013.01); *H04L 51/18* (2013.01); *H04L 69/22* (2013.01); *H04L 69/18* (2013.01)

(58) Field of Classification Search
CPC ......... H04L 51/18; H04L 67/02; H04L 69/18; H04L 69/22

(Continued)

(56) References Cited

U.S. PATENT DOCUMENTS 5,907,678 A 5/1999 Housel et al.
6,175,867 B1 * 1/2001 Taghadoss .............. H04L 12/24
370/401

(Continued)

FOREIGN PATENT DOCUMENTS

CN 101557329 A 10/2009
CN 101577704 A 11/2009

(Continued)

OTHER PUBLICATIONS

Shaohua, Y., "Output ITU-T Recommendation Y.dpireq Requirements for Deep Packet Inspection in Next Generation Networks," Telecommunication Standardization Sector, Study Group 13, TD 201 Rev.1—clean (WP 4/13), Study Period 2009-2012, Question 17/13, Oct. 10-17, 2011, 94 pages.

(Continued)

*Primary Examiner* — Kostas Katsikis
(74) *Attorney, Agent, or Firm* — Conley Rose, P.C.

(57) ABSTRACT

A method for parsing a network message and a communication device, which includes: receiving a network message, where the network message includes one or more sections; identifying that an application protocol type of the network message is a first application protocol; acquiring, from a current section that is in the network message and that is described by a piece of section description information in a configuration file corresponding to the first application protocol, interesting data indicated by interesting data indication information in the section description information; and executing a decision method in the section description information by using all or a part of the acquired interesting data as a decision condition, thereby obtaining a corresponding decision result, when the current section is a last section of the network message, the decision result includes a (Continued)

processing method of a next message of the network message.

33 Claims, 11 Drawing Sheets

(58) Field of Classification Search
USPC .................................................. 709/224
See application file for complete search history.

(56) References Cited

U.S. PATENT DOCUMENTS

| | | | |
|---|---|---|---|
| 6,483,804 B1* | 11/2002 | Muller ................. | H04L 49/602 370/230 |
| 6,581,108 B1* | 6/2003 | Denison ............ | H04L 29/12009 709/223 |
| 6,598,034 B1* | 7/2003 | Kloth .................. | H04L 12/2602 370/338 |
| 6,862,267 B1* | 3/2005 | Hughes ................. | H04L 29/06 370/252 |
| 6,952,425 B1 | 10/2005 | Nelson | |
| 7,136,385 B2* | 11/2006 | Damon ............. | H04L 29/12009 370/389 |
| 7,565,497 B1* | 7/2009 | Garthwaite ......... | G06F 12/0269 711/158 |
| 7,570,661 B2 | 8/2009 | Miller et al. | |
| 2004/0117425 A1* | 6/2004 | Berkland ................ | H04L 29/06 709/200 |
| 2007/0150478 A1 | 6/2007 | Cho et al. | |
| 2007/0156859 A1* | 7/2007 | Savchenko ............ | H04L 67/02 709/220 |
| 2010/0319071 A1 | 12/2010 | Ganacharya et al. | |
| 2011/0075675 A1* | 3/2011 | Koodli .................... | H04L 12/14 370/401 |

FOREIGN PATENT DOCUMENTS

| | | |
|---|---|---|
| CN | 102098331 A | 6/2011 |
| CN | 102413141 A | 4/2012 |
| WO | 2010145853 A1 | 12/2010 |

OTHER PUBLICATIONS

Dusi, M., et al., "Tunnel Hunter: Detecting Application-layer Tunnels with Statistical Fingerprinting," XP025692203, Elsevier, Computer Networks, Jan. 16, 2009, pp. 81-97.

Abuhmed, T., et al., "A Survey on Deep Packet Inspection for Intrusion Detection Systems," XP055141874, Mar. 1, 2008, 10 pages.

Foreign Communication From a Counterpart Application, European Application No. 12853692.7, Extended European Search Report dated Oct. 1, 2014, 6 pages.

Foreign Communication From a Counterpart Application, Chinese Application No. 201110389258.1, Chinese Office Action dated Nov. 27, 2013, 5 pages.

Foreign Communication From a Counterpart Application, Chinese Application No. 201110389258.1, Chinese Office Action dated Apr. 30, 2014, 5 pages.

Foreign Communication From a Counterpart Application, PCT Application No. PCT/CN2012/085494, English Translation of International Search Report dated Feb. 28, 2013, 2 pages.

Foreign Communication From a Counterpart Application, PCT Application No. PCT/CN2012/085494, English Translation of Written Opinion dated Feb. 28, 2013, 8 pages.

* cited by examiner

| | |
|---|---|
| 100 | GET /sweet.3gp HTTP/1.0\r\n |
| 101 | User-Agent: Mozilla/5.0\r\n<br>Accept: application/x-rtsp-tunnelled\r\n<br>Pragma: no-cache\r\n<br>Cache-Control: no-cache\r\n<br>\r\n |
| 102 | HTTP/1.0 200 OK\r\n |
| 103 | Server: RealServer 1.0\r\n<br>Expires: Mon, 18 May 1974 00:00:00 GMT\r\n<br>Pragma: no-cache\r\n<br>x-server-ip-address: 10.13.4.3\r\n<br>Content-type: application/x-rtsp-tunnelled\r\n<br>\r\n |
| 104 | RTSP/1.0 200 OK\r\n |
| 105 | CSeq: 1\r\n<br>Date: Wed, 31 Mar 2004 01:18:50 GMT\r\n<br>Vsrc: http://10.13.4.3:8888/viewsource/eqDreA1\r\n<br>Last-Modified: Wed, 10 Mar 2004 02:07:17 GMT\r\n<br>Content-base: rtsp://10.13.4.3:554/sweet.3gp/\r\n<br>Vary: User-Agent, ClientID\r\n<br>Content-type: application/sdp\r\n<br>Content-length: 1903\r\n<br>\r\n |
| 106 | v=0\r\n<br>o=- 1078884437 1078884437 IN IP4 0.0.0.0\r\n<br>s=\<No title>\r\n<br>i=\<No author> \<No copyright>\r\n<br>C=IN IP4 0.0.0.0\r\n<br>...... |
| 107 | RTSP/1.0 200 OK\r\n |
| 108 | CSeq: 4\r\n<br>Date: Wed, 31 Mar 2004 01:18:50 GMT\r\n<br>Session: 77495610-2;timeout=80\r\n<br>RTP-Info: url=rtsp://10.13.4.3:554/sweet.3gp/<br>streamid=0;seq=0;rtptime=0, url=rtsp://10.13.4.3:554/sweet.3gp/<br>streamid=1;seq=0;rtptime=0\r\n<br>Range: npt=0-5623.100000\r\n<br>RTCP-Interval: 250\r\n<br>\r\n |
| 109 | $....a......W6.......\<a...zP..···<br><br>...... |

FIG. 6

METHOD FOR PARSING NETWORK MESSAGE AND COMMUNICATION DEVICE

CROSS-REFERENCE TO RELATED APPLICATIONS

This application is a continuation of International Application No. PCT/CN2012/085494, filed on Nov. 29, 2012, which claims priority to Chinese Patent Application No. 201110389258.1, filed on Nov. 30, 2011, both of which are hereby incorporated by reference in their entireties.

TECHNICAL FIELD

Embodiments of the present invention relate to the field of communications technologies, and in particular, to a method for parsing a network message and a communication device.

BACKGROUND

Currently, the fixed broadband service develops quickly, which brings both opportunities and challenges to operators. With the popularity of applications such as peer-to-peer (P2P), online games, Web television (TV), and Voice over Internet Protocol (VoIP), a series of issues such as broadband management, content-based charging, and information security processing follows.

A deep packet inspection (DPI) technology is considered as a most effective method to deal with a management issue resulting from that multiple services run in a network, that is, the DPI technology can be used to quickly parse network messages of the multiple services running in the network, and identify an application protocol to which a network message belongs.

However, only obtaining, by parsing, the application protocol to which the network message belongs is not enough, it is further required to obtain interesting data carried in the network message by parsing, for example, for a hypertext transfer protocol (HTTP) network message, a method for parsing an HTTP protocol network message is provided in the prior art, where specifically, a network server receives an HTTP protocol network message transmitted between a server and a client, and a data parsing module in the network server presets implementation logic according to a format of the HTTP protocol, and performs processing according to the preset logic after receiving the HTTP protocol network message. The parsing method in the prior art is described by using the following network message as an example:

"GET/root.html HTTP/1.1\r\n"
"User-Agent: Mozilla/5.0 \r\n"
"Host: d.wikimedia.org\r\n"
"Accept-Encoding: gzip,deflate\r\n"
"Keep-Alive: 115\r\n"
"Connection: keep-alive\r\n"
"Content-Length: 10\r\n\r\n"
"0123456789"

When parsing the HTTP protocol network message, the parsing module with a preset logic in the network server obtains, by matching, a request method type and a Host header field value from the network message by using a character-by-character scanning method. In the foregoing example, the determined request method type is "GET", information that is a uniform resource locator (URL) ("/root.html" specifically) requested by the request method and the Host header field value "d.wikimedia.org" are output to a policy matching module in the network server, where "/root.html" and "d.wikimedia.org" are interesting data carried in the network message; and the policy matching module obtains, by matching, a pre-defined policy, such as a charging policy, used by a data flow, and outputs the pre-defined policy to a policy execution module in the network server, so that the policy execution module in the network server executes the pre-defined policy for the data flow.

The prior art has the following disadvantages:

Because protocols are in different formats, extracted interesting data is different during processing, and it is required to perform analysis and processing for each protocol in advance. However, in a case where the network message received by the network server and transferred between the server and the client has multiple protocols for switching, for example, for a tunnel using the HTTP protocol as a real time streaming protocol (RTSP), an RTSP protocol network message is switched to a real time transport protocol (RTP) network message after a while, the prior art needs to reset implementation logic accordingly, and needs to modify software and hardware to support the protocol switching, so that hitless upgrade, that is, upgrade without service interruption, cannot be implemented, and the reliable operation of the network server is affected.

SUMMARY

Embodiments of the present invention provide a method for parsing a network message and a communication device, where because a configuration file is used, when a processing method of a next message changes, only section description information corresponding to an application protocol needs to be modified, instead of resetting logic for implementation, so that hitless upgrade can be implemented.

In view of this, the embodiments of the present invention provide:

A method for parsing a network message includes: receiving a network message, where the network message includes one or more sections; identifying that an application protocol type of the network message is a first application protocol; acquiring, from a current section that is in the network message and that is described by a piece of section description information in a configuration file corresponding to the first application protocol, interesting data indicated by interesting data indication information in the section description information; and executing a decision method in the section description information by using all or a part of the acquired interesting data as a decision condition, thereby obtaining a corresponding decision result, wherein when the current section is a last section of the network message, the decision result includes a processing method of a next message of the network message and both the network message and the next message belong to a same application layer.

A communication device includes: a communications module configured to receive a network message, where the network message includes one or more sections; an identification module configured to identify that an application protocol type of the network message is a first application protocol; and a parsing module configured to acquire, from a current section that is in the network message and that is described by a piece of section description information in a configuration file corresponding to the first application protocol, interesting data indicated by interesting data indication information in the section description information; execute a decision method in the section description information by using all or a part of the acquired interesting data as a decision condition, thereby obtaining a corresponding decision result, wherein when the current section is a last section of the network message, the decision result includes a processing method of a next message of the network message and both the network message and the next message belong to a same application layer.

A parsing system includes: a compiling engine and a processing engine, where the compiling engine is configured to compile a configuration file into protocol parsing auxiliary data that can be identified by the processing engine, where different application protocol types correspond to different configuration files; and the processing engine is configured to receive a network message, where the network message includes one or more sections and identify that an application protocol type of the network message is a first application protocol; acquire, from a current section that is in the network message and that is described by a piece of section description information in protocol parsing auxiliary data corresponding to the first application protocol, interesting data indicated by interesting data indication information in the section description information; and execute a decision method in the section description information by using all or a part of the acquired interesting data as a decision condition, thereby obtaining a corresponding decision result, wherein when the current section is a last section of the network message, the decision result includes a processing method of a next message of the network message and both the network message and the next message belong to a same application layer.

In the embodiments of the present invention, interesting data in a current section described by section description information is acquired by using the section description information, a decision method in the section description information is executed according to the interesting data, and a processing method of a next message is decided. In this way, if the processing method of the next message changes, the decision method described in the section description information may be modified for implementation, instead of resetting logic for implementation, so that hitless upgrade can be implemented, and flexibility is also improved.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

FIG. 6 is a structural diagram of a network message according to an embodiment of the present invention;

DESCRIPTION OF EMBODIMENTS

Figure 1A:
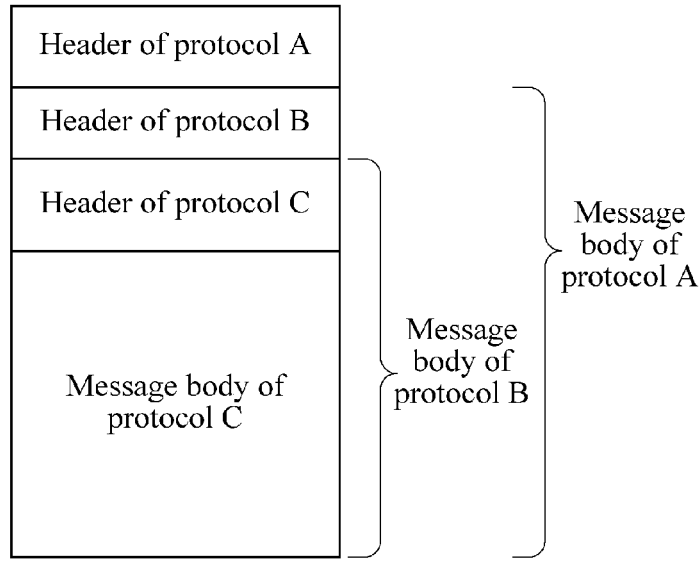
FIG. 1A is a schematic diagram of protocol bearing according to an embodiment of the present invention.

For ease of understanding, some concepts involved in embodiments of the present invention are first introduced as follows:

As shown in FIG. 1A, protocol bearing refers to bearing a message of a second application layer in a message of a first application layer, where the message of the second application layer is a message body of the message of the first application layer, and the first application layer is an application layer above the second application layer. Specifically, a protocol stack of network data is in a hierarchical relationship, a message of a lower application layer is encapsulated and carried by a message of an upper application layer, for example, in the network data, a header of a message of protocol A appears first, and then a message body of the message of protocol A appears, where the message body is a message of protocol B, the message of protocol B is also internally divided into a header and a message body, and the message body of protocol B is a message of protocol C. In this way, the message of protocol A bears the message of protocol B, and the message of protocol B bears the message of protocol C.

Figure 1B:
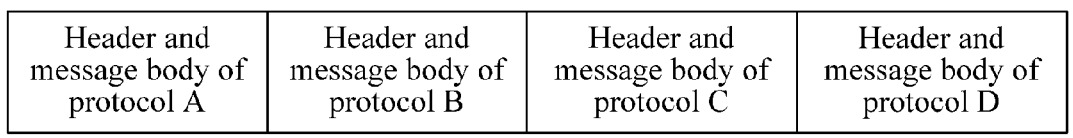
FIG. 1B is a schematic diagram of protocol switching according to an embodiment of the present invention.

As shown in FIG. 1B, protocol switching is protocol switching between network messages using different application protocols at a same application layer in a data flow. In other words, messages involved in the protocol switching are messages of the same application layer. For example, in the same data flow, the message of protocol A appears first, and the message of protocol A plays a certain role, for example, is used as a tunnel, or is used for capability negotiation, or the like. After the message of protocol A is processed completely, the message of protocol A is switched to the message of protocol B, then the message of protocol B is switched to the message of protocol C, and then the message of protocol C is switched to a message of protocol D, where protocol A, protocol B, protocol C, and protocol D are different application protocols at the same application layer, for example, an HTTP protocol is switched to an RTSP protocol, and then is switched to an RTP protocol.

Figure 1C:
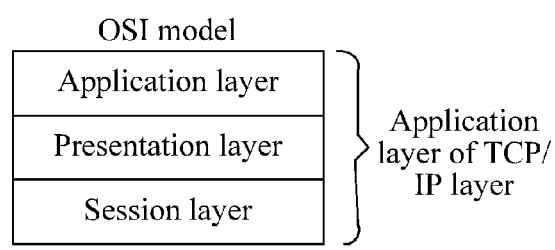
FIG. 1C is a schematic diagram of an application layer protocol according to an embodiment of the present invention.

As shown in FIG. 1C, an application layer protocol in the embodiments of the present invention refers to an application layer protocol at a transmission control protocol (TCP)/Internet Protocol (IP) layer, the application layer protocol at the TCP/IP layer includes three layers, which are respectively equivalent to a session layer, a presentation layer, and an application layer of an open system interconnection (OSI) model.

In the embodiments of the present invention, configuration files corresponding to application protocols are pre-configured, and structures of the configuration files corresponding to the different application protocols are basically the same. In a configuration file, a designer describes or divides, according to a protocol structure and a requirement at a detail level of parsing, a network message in a certain protocol format into one or more sections, and describes a feature and processing method of each section. It should be understood that, network messages of some protocols, such as a binary protocol, cannot be divided, for example, a domain name system (DNS) does not have a distinct delimiter, and accordingly, a network message of a protocol of such a type can only be indicated by one section. However, most protocols currently used by network traffic on a network can be divided.

To make the technical solutions of the embodiments of the present invention more comprehensible, a configuration file is introduced as follows:

A configuration file corresponding to each application protocol includes one or more pieces of section description information, where the section description information indicates a feature and processing method of a section, a minimum information set of the section description information is a section name and a section type. If the configuration file includes multiple pieces of section description information, it should be understood that, some section description information may include a section name, a section type, interesting data indication information, and a decision method; some section description information may only include a section name and a section type; some section description information may include a section name, a section type, information of a next section; and some section description information may include a section name, a section type, interesting data indication information, a decision method, and a delimiter (one or more of a data delimiter and a section delimiter).

It should be noted that, the embodiments of the present invention focus on introduction about how to obtain interesting data by parsing a network message when a configuration file corresponding to an application protocol includes one or more pieces of section description information, among which at least one piece of section description information includes a section name, a section type, interesting data indication information, and a decision method.

Figure 1D:
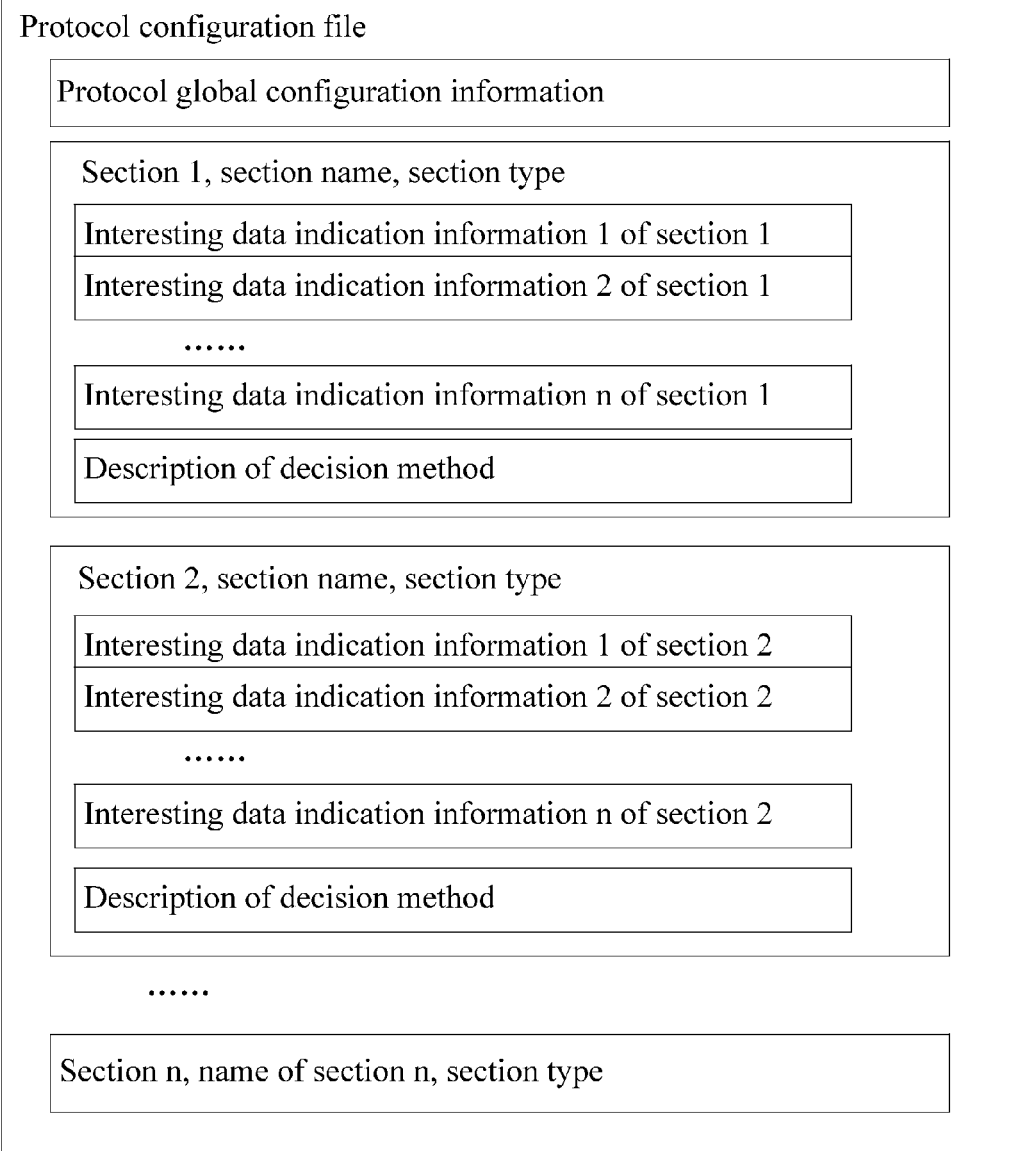
FIG. 1D is a schematic structural diagram of a configuration file according to an embodiment of the present invention.

FIG. 1D is a schematic structural diagram of a configuration file according to an embodiment of the present invention. As shown in FIG. 1D, the configuration file corresponding to the application protocol includes:

1. Protocol global configuration information corresponding to the protocol is included, for example, a protocol name, whether it is case-sensitive, and the like. In an actual application, whether it is case-sensitive is optional.

2. Each section separated according to the protocol is described, where the section includes a section name, section type, interesting data indication information, and a decision method, and the section type indicates a scanning method of the section, such as a fast scanning method, a regular expression matching method, and a method for directly skipping according to a certain length.

3. Interesting data indication information is needed in each section to describe the section, so that during parsing, corresponding interesting data is obtained by using the interesting data indication information, and the interesting data is output to a policy matching module for matching of a pre-defined policy, or the interesting data is used as a decision basis.

4. A decision condition, a decision method, and a decision result may be described in each section. The decision condition includes one or more pieces of interesting data. If the decision condition is not provided, it indicates that no decision is required and a next section is directly skipped to. If a current section is a last section, or the decision result is that no further processing is required, after the section is scanned, the whole protocol data processing is complete.

It should be understood that, in an implementation manner, configuration files corresponding to different application protocols may be stored in a computer medium, and content of the configuration files may be loaded again when a system is started or runs normally, and is compiled into protocol parsing auxiliary data (such as a structure body, a linked list, and an array) that can be read directly by a computer, and stored in computer memory for reading in protocol parsing processing. A format of a configuration file may use any format, such as eXtensible Markup Language (XML), that can describe the foregoing information.

Figure 2:
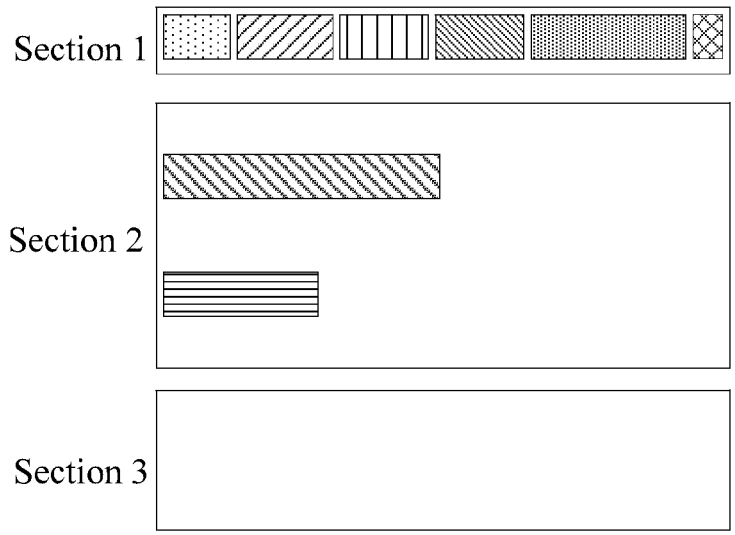
FIG. 2 is a schematic diagram of section division according to an embodiment of the present invention.

In the embodiments of the present invention, the concept of "section" is introduced. FIG. 2 is a schematic diagram of section division of a network message of an application protocol, where several rectangular boxes represent sections, and rectangles with various patterns represent different interesting data. As can be seen from FIG. 2, interesting data of section 1 is described in detail, of which each character may be required specifically. Section 1 is generally a first line of an application protocol, for example, a first line of an HTTP protocol, which specifically is "GET www.abc.com HTTP/1.1", and accordingly, interesting data includes a request method "GET", a URL "www.abc.com", and a version number "1.1". Therefore, a regular expression scanning method may be used for the first line. As can be seen from FIG. 2, a small amount of interesting data exists in section 2, where section 2 is generally a header field part (also referred to as a header field section) of a message of an application protocol, the figure shows that only two pieces of interesting data are included in section 2, the other data may all be ignored, the section may use a fast scanning method, and the fast scanning method is described in detail in a subsequent embodiment. As can be seen from FIG. 2, section 3 does not have interesting data, where section 3 is generally a message body of a network message, which does not include any interesting data and does not need to be parsed, and therefore may be wholly skipped.

Based on the section division manner of the network message of the application protocol in the foregoing, section description information in the configuration file corresponding to the application protocol is determined, which includes section description information 1, section description information 2, and section description information 3, where a section described by section description information 1 is the first line of the network message, a section described by section description information 2 is the header field part of the network message, and a section described by section description information 3 is the message body of the network message.

Section description information 1 includes a section name, a section type, and interesting data indication information, where the section type indicates that the section uses the regular expression scanning method. Section description information 1 may further include a section delimiter, and the section delimiter is used for a network server to separate the first line from the network message, for example, the section delimiter may be "\r\n".

Section description information 2 includes a section name, a section type, interesting data indication information, and a decision method, where the section type indicates that the section uses the fast scanning method. Section description information 2 may further include a data delimiter and a section delimiter. The data delimiter is used for separating data from the header field part, and the section delimiter is used for the network server to separate the header field part from the network message, where the section delimiter may be "\r\n\r\n".

Section description information 3 includes a section name and a section type, where the section type indicates that a scanning method used by the section is to skip characters of a preset length, and the preset length is a length of the message body of the network message. The section delimiter in section description information 1 and the section delimiter in section description information 2 may be the same or different, which does not affect implementation of the present invention.

The network message described by section description information 1, section description information 2, and section description information 3 is a network message sent by a first device to a second device. Optionally, the section description information in the configuration file corresponding to the application protocol may further include section description information 4, section description information 5, section description information 6, and the like. In this case, a network message described by section description information 4, section description information 5, and section description information 6 is a network message sent by the second device to the first device, where definition of section description information 4 is similar to that of section description information 1, definition of section description information 5 is similar to that of section description information 2, and definition of section description information 6 is similar to that of section description information 3, which are not repeatedly described herein.

The interesting data indication information in section description information 1 may include indication information of a URL and indication information of a version number, and the like.

The interesting data indication information in section description information 2 may include at least one of the following information: first indication information that indicates protocol type information of a next section, second indication information that indicates length information of the next section, and third indication information that indicates encoding and decoding information of the next section.

It should be noted that section description information 1 may also have a decision method, or may not have a decision method, which does not affect the implementation of the present invention.

The decision method in section description information 2 indicates that different atomic methods are executed according to different decision conditions, and the atomic method includes one or more of the following:

1. Set a next section: determine what is the next section. For example, behind a first line section of a session initiation protocol (SIP) message is an SIP request header field section or an SIP response header field section, and in the case of the SIP request section, the section is processed according to a request section; and in the case of the SIP response section, the section is processed according to a response section.

2. When the next section is a type of directly skipping a specific length, set the next section as a section with the specific length directly skipped, where the specific length is a parameter required by the atomic method, for example, a header field Content-Length of a real time streaming protocol (RTSP) message indicates a length of a message body part of the message.

Determining that a complete message ends is equivalent to completing a complete protocol processing cycle, which is essentially to set the next section as a first section of a current protocol type, and perform another cycle. For example, after an HTTP message is processed, another HTTP message continues to be sent in a same flow.

3. Change a protocol type of a next message (which may be specifically understood as changing a protocol type of a first section of the next message). When a protocol type of a current data flow changes, it is required to switch to a protocol of another type, and the next message uses the changed protocol. For example, after an RTSP message body section ends, the next message is a message of an RTP protocol.

4. Set a decoding algorithm that needs to be performed before the next section is to be processed, which indicates that it is required to perform a decoding algorithm on the next section before extracting information from the next section, so as to obtain real information. For example, some simple mail transfer protocol (SMTP) message bodies are encoded by using base64, which need to be decoded before processing. For another example, some HTTP protocol message bodies are compressed by using gzip, which need to be decompressed before processing.

The atomic method may further have a parameter, and the parameter is used for transferring some decision results for execution of the atomic method.

A certain order relationship exists between sections, but a section is not necessarily followed by a fixed section, and data is not necessarily data in a current protocol format either, which may be switched to another protocol. Alternatively, protocol switching is even performed only after several messages are processed, and sequential protocols are not in a bearing relationship.

Figure 3:
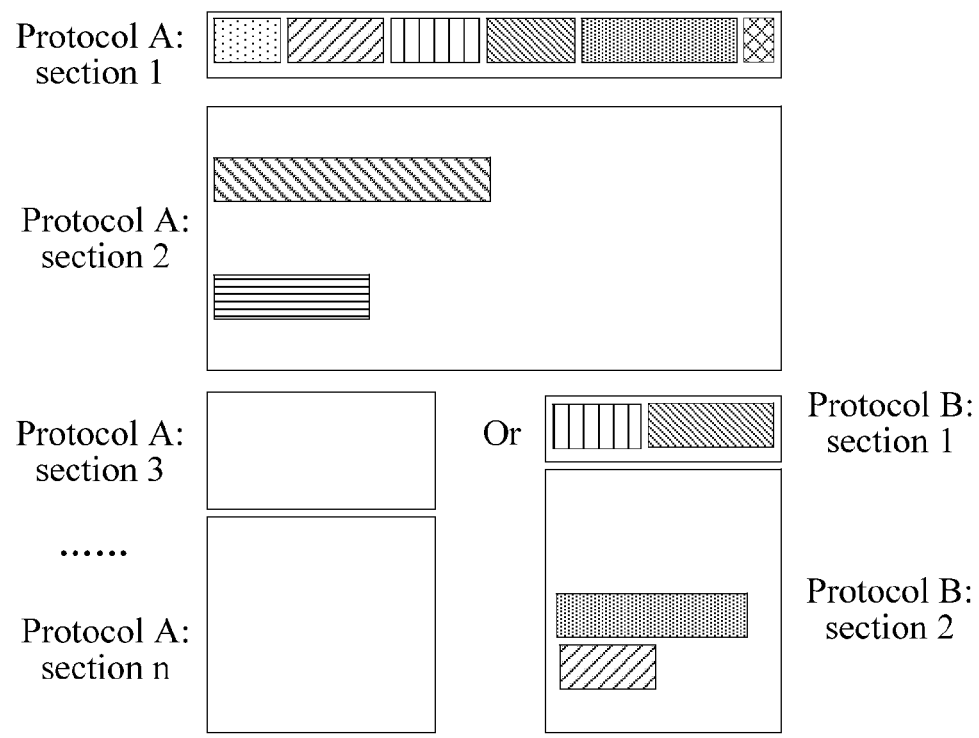
FIG. 3 is a schematic diagram of section distribution used by a network message according to an embodiment of the present invention.

As shown in FIG. 3, network messages appear in top-to-bottom order. In a case, network messages received by a network server and transferred between a server and a client are all network messages of application protocol A, and a network message of application protocol A includes multiple sections. In another case, for the network messages received by the network server and transferred between the server and the client, switching is performed between multiple protocols, for example, protocol A is switched to protocol B. After a current section is processed and before a next section is to be processed, a decision needs to be made so as to determine what is the next section. For example, as shown in FIG. 3, section 1 and section 2 use section description information 1 and section description information 2 of protocol A respectively, the network server makes a decision according to a decision method in section description information 2. In a case, the network message has the next section, a decision result indicates that the next section is a next section of a network message of protocol A (for example, behind the header field section of the SIP message is a message body section), and section 3 of the network message may continue to use section description information 3 of protocol A. In another case, the network message does not have the next section, a decision result indicates that a next network message is a network message of protocol B, and correspondingly, the network message is also divided into multiple sections, such as section 1 of protocol B, section 2 of protocol B, and the like; in this case, a protocol switching relationship exists between protocol B and protocol A, that is, protocol A is switched to protocol B, and correspondingly, section 1 and section 2 of protocol B use section description information 1 and section description information 2 of protocol B respectively.

Figure 4:
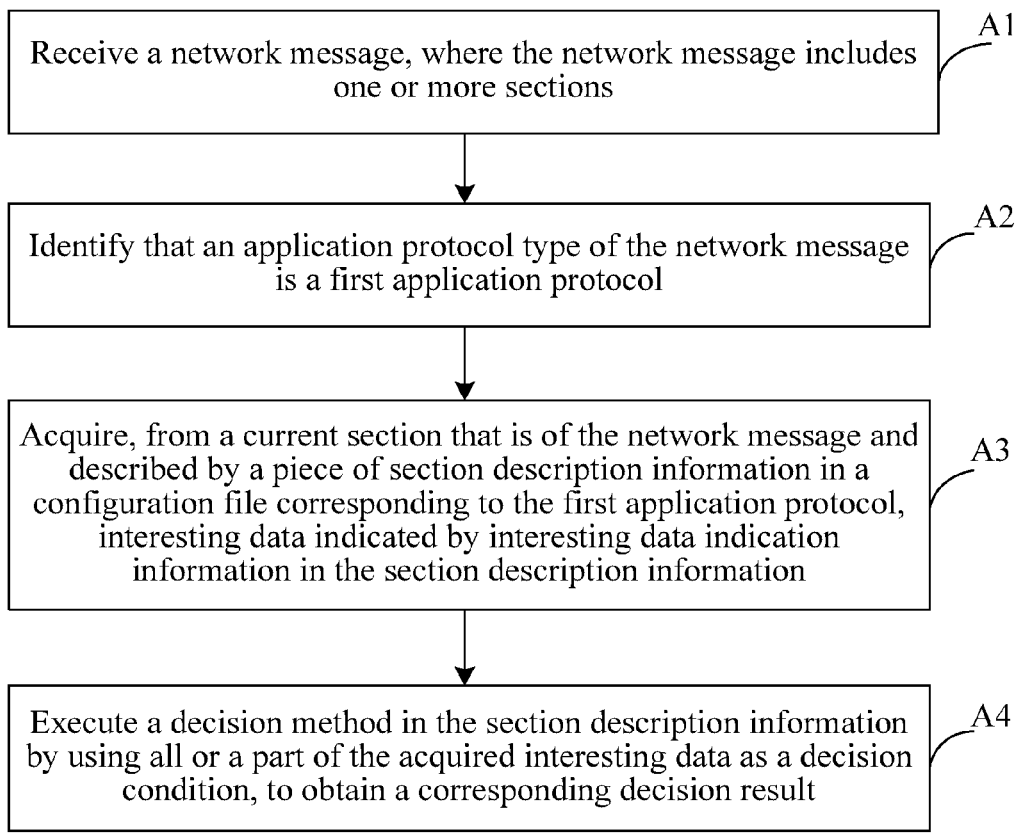
FIG. 4 is a flowchart of a method for parsing a network message according to an embodiment of the present invention.

Referring to FIG. 4, an embodiment of the present invention provides a method for parsing a network message, where the method includes:

A1: Receive a network message, where the network message includes one or more sections.

In different implementation manners, sections may be separated by a separator or separated according to a given offset length.

Steps in the embodiment of the present invention may be performed by a network server. The network server is in communication connection with a first device and a second device, the received network message is an uplink network message sent by the first device to the second device or a downlink network message sent by the second device to the first device, that is, the received network message is a network message transmitted between the first device and the second device.

The first device may be a client, and the second device may be a server.

A2: Identify that an application protocol type of the network message is a first application protocol.

A3: Acquire, from a current section that is in the network message and that is described by a piece of section description information in a configuration file corresponding to the first application protocol, interesting data indicated by interesting data indication information in the section description information.

The section description information in the configuration file corresponding to the first application protocol may be the foregoing section description information 2, and the current section may be a header field part of the network message.

It should be noted that, when the first application protocol is a line-based text protocol (such as the HTTP and the RTSP), the interesting data indication information is a header field name, and correspondingly, the interesting data indicated by the interesting data indication information is a header field value located behind the corresponding header field name, or interesting data indicated by the corresponding header field name.

When the first application protocol is a non-text protocol (such as the DNS and the RTP), the interesting data indication information is an attribute name, and correspondingly, the interesting data indicated by the interesting data indication information is an attribute value.

When the first application protocol is a label protocol (such as the XML and the hypertext markup language (HTML)), the interesting data indication information is a label name, and correspondingly, the interesting data indicated by the interesting data indication information is a label value.

In the following of the embodiment of the present invention, a specific description is provided by using an example that the first application protocol is a line-based text protocol.

A4: Execute a decision method in the section description information by using all or a part of the acquired interesting data as a decision condition, thereby obtaining a corresponding decision result.

It should be noted that, in an actual application, the acquired interesting data may be one or more pieces, for example, the acquired interesting data may be 5-10 pieces, of which 2-4 pieces may be used as the decision condition. It should be understood that, the acquired interesting data may be classified into the following three cases:

Case 1: A part of the acquired interesting data is output to an external application for use, while the other part of the acquired interesting data is used as the decision condition.

Case 2: The acquired interesting data is not only used as the decision condition, but also output to an external application for use.

Case 3: The acquired interesting data is used as the decision condition.

When the current section is a last section of the network message, the decision result includes a processing method of a next message of the network message and both the network message and the next message belong to a same application layer. Correspondingly, the executed atomic method may be changing the protocol type of a current data flow, that is, the next message uses a protocol type different from that of the current network message.

When the current section is not the last section of the network message, the decision result indicates a processing method of a next section of the current section. Correspondingly, the executed atomic method includes any one or a combination of the following: setting the next section, setting a protocol type of the next section, setting a length of the next section, and setting a decoding algorithm that needs to be performed before the next section is to be processed.

The decision method indicates that different atomic methods are executed according to different decision conditions, the decision condition includes one or more pieces of interesting data, and the decision result includes one or more of the following atomic methods and a parameter required for execution of the atomic method.

The executed atomic method includes any one or a combination of the following: setting the next section, changing the protocol type of the first section of the next message, setting the protocol type of the next section, and setting the decoding algorithm that needs to be performed before the next section is to be processed.

In an implementation manner, the decision method indicates that different atomic methods are executed according to different decision conditions; and the decision condition includes one or more pieces of interesting data, wherein when the interesting data indication information includes first indication information that indicates protocol type information of the next section and second indication information that indicates length information of the next section, and the acquired interesting data includes the protocol type information and the length information, the protocol type information and the length information are used as the decision condition, the length information indicates that the current section is the last section; and the corresponding decision result includes an atomic method of changing the protocol type of the first section of the next message, where the protocol type of the first section of the next message is a protocol type indicated by the protocol type information; or when the interesting data indication information includes first indication information that indicates protocol type information of the next section, and the acquired interesting data includes the protocol type information, the protocol type information is used as the decision condition, and the corresponding decision result includes an atomic method of changing the protocol type of the first section of the next message, where the protocol type of the first section of the next message is a protocol type indicated by the protocol type information.

In another implementation manner, the decision method indicates that different atomic methods are executed according to different decision conditions; and the decision condition includes one or more pieces of interesting data, wherein when the interesting data indication information includes first indication information that indicates protocol type information of the next section, and the acquired interesting data includes the protocol type information, the protocol type information is used as the decision condition, and the corresponding decision result includes an atomic method of setting the protocol type of the next section, where the protocol type of the next section is a protocol type indicated by the protocol type information.

In still another implementation manner, the decision method indicates that different atomic methods are executed according to different decision conditions; and the decision condition includes one or more pieces of interesting data, wherein when the interesting data indication information includes second indication information that indicates length information of the next section, and the acquired interesting data includes the length information, the length information is used as the decision condition, and the corresponding decision result includes an atomic method of setting the next section as a section with a preset length directly skipped, where the preset length is a length indicated by the length information.

In yet another implementation manner, the decision method indicates that different atomic methods are executed according to different decision conditions; and the decision condition includes one or more pieces of interesting data, wherein when the interesting data indication information includes third indication information that indicates encoding and decoding information of the next section, and the acquired interesting data includes the encoding and decoding information, the encoding and decoding information is used as the decision condition, and the corresponding decision result includes an atomic method of setting a decoding algorithm that needs to be performed before the next section is to be processed, where the decoding algorithm that needs to be performed before the next section is to be processed is a decoding algorithm indicated by the encoding and decoding information.

It can be seen that, in the embodiment of the present invention, interesting data in a section described by section description information is acquired by using the section description information, a decision method in the section description information is executed according to the interesting data, and a processing method of a next section or a next network message is decided. In this way, if a method for parsing a network message changes, interesting data indication information and/or the decision method described in the section description information may be modified for implementation; and if a parsing capability for a new application protocol needs to be added, only a configuration file of the new application protocol needs to be added, instead of resetting software or hardware logic for implementation, so that hitless upgrade can be implemented.

Figure 5:
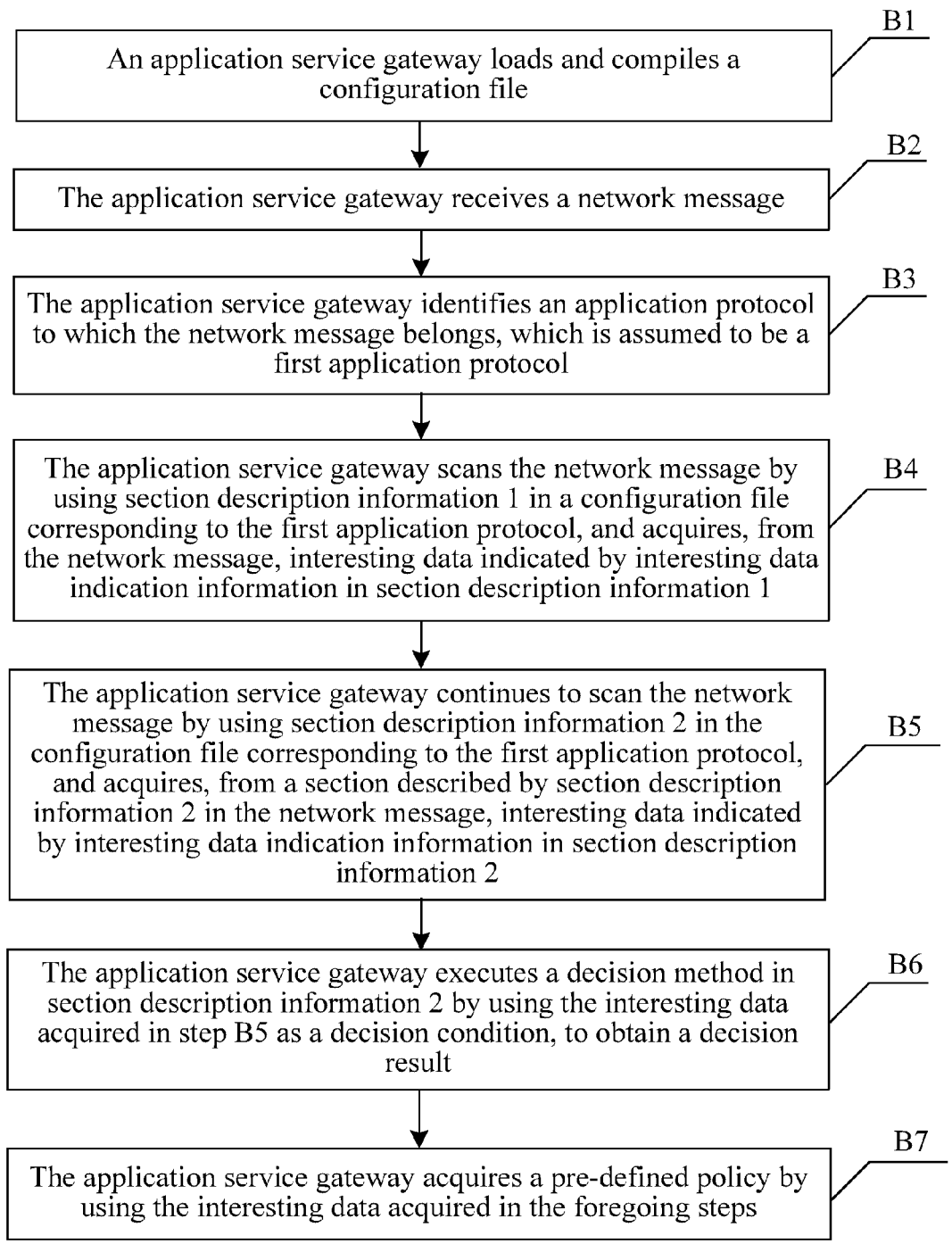
FIG. 5 is a flowchart of a method for parsing a network message according to another embodiment of the present invention.

To make the foregoing technical solution provided by the present invention more comprehensible, the method for parsing a network message is described in the following by using an example that the network server is an application service gateway. Referring to FIG. 5, the following describes the foregoing technical solution provided by the embodiment of the present invention in detail:

B1: An application service gateway loads and compiles a configuration file.

The application service gateway compiles the configuration file, generates protocol parsing auxiliary data that is directly read by a computer, and stores the protocol parsing auxiliary data.

B2: The application service gateway receives a network message.

The network message received in this step may be a network message sent by a server to a client, or may be a network message sent by the client to the server.

B3: The application service gateway identifies an application protocol to which the network message belongs, which is assumed to be a first application protocol.

Specifically, the application protocol to which the network message belongs may be identified by using a protocol identification method in the prior art, for example, using a TCP/user data protocol (UDP) port identification method, or a feature field identification method, or a protocol behavior identification method, or the like.

B4: The application service gateway scans the network message by using section description information 1 in a configuration file corresponding to the first application protocol, and acquires, from the network message, interesting data indicated by interesting data indication information in section description information 1.

Section description information 1 is section description information corresponding to a first line, and section description information 1 includes a section name, a section type, interesting data indication information, and a section delimiter, where the section type indicates that a scanning method used by the section is a regular expression scanning method. The specific implementation manner of this step comprises the application service gateway scans, in the regular expression scanning method, interesting data indication information in the network message until a section delimiter is obtained by scanning, where a section separated by the section delimiter is the first line of the application protocol. Section description information 1 may further include information of a next section, for example, a name of the next section, which is assumed to be a name of section description information 2 in this embodiment. In this embodiment, section description information 1 does not have a decision method. In this way, after completing scanning the first line of the network message, the application service gateway processes data in the header field part of the network message according to the name of the next section in section description information 1 and by using section description information 2.

B5: The application service gateway continues to scan the network message by using section description information 2 in the configuration file corresponding to the first application protocol, and acquires, from the section described by section description information 2 in the network message, interesting data indicated by interesting data indication information in section description information 2.

Section description information 2 is section description information corresponding to the header field part, and section description information 2 includes a section name, a section type, interesting data indication information, a decision method, a data delimiter, and a section delimiter. A scanning method indicated by the section type is a fast scanning method, the interesting data indication information is the header field, and the specific implementation manner of this step comprises the application service gateway continues to scan, in the fast scanning method and in the network message, interesting data indication information in section description information 2 until the section delimiter is obtained by scanning, where a section separated by the section delimiter is the section described by section description information 2, which is specifically the header field part of the network message. For details about the fast scanning method, refer to detailed introduction in a subsequent embodiment.

B6: The application service gateway executes the decision method in section description information 2 by using the interesting data acquired in step B5 as a decision condition, thereby obtaining a decision result.

If first indication information that indicates protocol type information is not obtained, by scanning, in the header field part of the network message, but second indication information that indicates length information is obtained by scanning, a corresponding decision result is obtained, where the decision result includes an atomic method of setting "the next section as a section with a specific length directly skipped", where the specific length is a length indicated by the length information. In this case, section description information used by the next section may be section description information 3. The first indication information may be Content-Type, and the second indication information may be Content-Length. It should be noted that, in order to decide which atomic methods are to be executed in the section, whether the first indication information is obtained by scanning may not serve as a basis, that is, the decision is only based on whether the second indication information is obtained by scanning; in other words, in some implementation manners, the decision can be made by using the second indication information only.

In an implementation manner, if the first indication information is obtained, by scanning, in the header field part of the network message and both the section (that is, the header field part) described by section description information 2 in the network message is a last section of the network message, a corresponding decision result is obtained, where the decision result includes an atomic method of changing a protocol type of a current data flow to the protocol type indicated by the first indication information, for example, the current network message is of an HTTP type, the next network message is of the protocol type indicated by the first indication information, that is, a second application protocol of, for example, an RTSP type, and in this case, the two protocols are in a protocol switching relationship. For specific definition of protocol switching and related description, refer to the foregoing description, which is not repeatedly described herein. Specifically, if the second indication information is not obtained by scanning in the header field part of the network message, it may indicate that the header field part is the last section of the network message.

In another implementation manner, if the first indication information is obtained, by scanning, in the header field part of the network message and both the section indicated by section description information 2 in the network message is not the last section of the network message, a corresponding decision result is obtained, where the decision result includes an atomic method of setting the protocol type of the next section to the protocol type indicated by the first indication information, for example, the second application protocol, and in this case, the next section is a message body of the current network message and both the first application protocol to which the network message belongs and the second application protocol used by the message body are in a bearing relationship. For specific definition of protocol bearing and related description, refer to the foregoing description, which is not repeatedly described herein.

It should be noted that, in the foregoing second case, after operations on the message body in the network message are complete, subsequently, it is further required to continue to process the next network message by using again the configuration file corresponding to the first application protocol.

It the third indication information that indicates the encoding and decoding information is obtained, by scanning, in the header field part of the network message, a corresponding decision result is obtained, where the decision result includes an atomic method of setting a decoding algorithm that needs to be performed before the next section is to be processed, for example, the encoding and decoding type indicated by the third indication information may be base64, and accordingly, the next section needs to be decoded first before an operation is executed on the next section. For a simple mail transfer protocol (SMTP), and the next section, that is, the message body of the network message may be decoded by using the decoding algorithm corresponding to the encoding and decoding type.

B7: The application service gateway acquires a pre-defined policy by using the interesting data acquired in the foregoing steps.

The pre-defined policy is a policy used for processing the network message transmitted between the client and the server, which may be a policy such as blocking and charging.

It can be seen that, in the embodiment of the present invention, interesting data in a section described by section description information is acquired by using the section description information, a decision method in the section description information is executed according to the interesting data, and a processing method of a next section is decided. In this way, if a method for parsing a network message changes, interesting data indication information and/or the decision method described in the section description information may be modified for implementation, for example, if the interesting data changes, the interesting data indication information needs to be modified; for another example, if the processing method of the next section or a next network message changes, the decision method needs to be modified; if a parsing capability for a new application protocol needs to be added, only a configuration file of the new application protocol needs to be added, instead of resetting logic for implementation, so that hitless upgrade can be implemented.

Referring to FIG. 6, the method for parsing a network message provided by the embodiment of the present invention is described in detail by using an example as follows:

FIG. 6 shows network messages transmitted between the client and the server, where a rectangular box of a thick line represents a network message, a rectangular area of a thin line represents a section, such as section 100 to section 109. As shown in FIG. 6, an HTTP protocol message and an RTSP protocol message may include a first line section, a header field part section, and a message body part section, for example, section 100 corresponds to the first line section;

and section 101 corresponds to the header field part section. It should be understood that, in an actual application, some messages may not have a message body part section, for example, there is no message body behind section 101, and a first line of a response message follows immediately. The bold font is interesting data indication information, such as Content-type, Content-length, and RTP-Info. The underlined bold font is interesting data indicated by the interesting data indication information, for example, interesting data "application/sdp" indicated by Content-type, and interesting data "1903" indicated by Content-length. In other words, in the embodiment of the present invention, the interesting data indication information may be a header field Content-Type (shown by the bold font in sections 103 and 105), and a header field Content-Length (shown by the bold font in section 105), a header field RTP-Info (shown by the bold font in section 108), and correspondingly, the interesting data indicated by the interesting data indication information is a header field value of the header field Content-Type, a header field value of the header field Content-Length, and a header field value of the header field RTP-Info, where a section delimiter in the first line is "\r\n" in the HTTP protocol network message and the RTSP protocol network message, as section 100 and section 102 of the HTTP protocol network message and section 104 of the RTSP protocol network message in FIG. 6; the section delimiter of the header field part of the HTTP protocol network message is "\r\n\r\n", and the data delimiter is "r\n", as section 101 of the HTTP protocol network message in FIG. 6. Section 109 is data in an RTP format, which may specifically be video data.

In a manner, a decision needs to be made after a section ends or before a next section is to be processed; in another manner, a next section is clear after some sections end, and therefore no decision is required. For example, a name of the next section already exists in the section description information, and in this case, it is considered by default that the next section is executed after the current section ends. For example, behind section 100 is definitely section 101; in this example, a decision is required after section 101, and in this example, the message ends after section 101. A configuration file used for parsing the network messages shown in FIG. 6 is shown as follows:

```
<Protocol Name="HTTP">
    <!-- Correspond to 100 -->
    <Section name="HTTP_FIRST_LINE_REQUEST" isFirst="true"
type="PCREX"next_section="HTTP_REQ_HEADER">
        <Regular expression>[A-Z]+ ([ \t])(?Fset(url, {-1}))
HTTP/1.1\r\n<regular expression> <!-- the regular expression of the first line of the
HTTP request -->
        <Output>url</Output> <!-- output the extracted URL, correspond to
201 -->
    </Section>
    <!-- Correspond to 102 -->
    <Section name="HTTP_FIRST_LINE_REQUEST" isFirst="true"
type="PCREX" next_section="HTTP_RSP_HEADER">
        <PCREX>HTTP/1.1 \d{3} [a-zA-Z]+\r\n</PCREX> <!-- the regular
expression of the first line of the HTTP response -->
    </Section>
    <!-- Correspond to 101 -->
    <Section name="HTTP_REQ_HEADER" type="fastscan"
section_delimiter="\r\n\r\n" data_delimiter="\r\n">
        <Interesting char="U"> <!-- the interesting data indication information
includes the starting character of the string "User-Agent"-->
            <Refine-Match>User-Agent:</Refine-Match> <!-- Used for
precise User-Agent matching -->
        </Interesting>
        </Interesting char="C">
            <Refine-Match>Content-Length:</Refine-Match>
            <!-- If Content-Length is encountered, store the value of
Content-Length into variable content_length -->
            <SetIntValue Name="content_length"/>
        </Interesting>
        <Decision> <!-- decision method, executed after 101 ends -->
            <Condition>content_length</Condition>
            <!-- If content-length is not 0, execute set_next_section,
                Parameter is LEN_TRACKING, content_length -->
            <Rule action="set_next_section" parameter=" LEN_TRACKING,
content_length">non_zero</Rule>
    <!-- If content-length is 0, execute the atomic method end_of_message, and end
the current message parsing -->
            <Rule action="end_of_message"> zero</Rule>
        </Decision>
    </Section>
    <!-- Correspond to 103 -->
    <Section name="HTTP_RSP_HEADER" type="fastscan"
section_delimiter="\r\n\r\n" data_delimiter="\r\n">
        <Interesting char="C"> <!-- interesting data indication information
includes the starting character of the string "Content-Type"-->
            <Refine-Match>Content-Type:</Refine-Match> <!-- Used for
precise Content-Type matching -->
            <!-- If the header field value of Content-Type is
"application/x-rtsp-tunnelled, set the variable is_rtsp_tunnel to true -->
            <SetFlag flag="is_rtsp_tunnel"
value="true">application/x-rtsp-tunnelled</SetFlag>
        </Interesting>
```

```
            <Interesting char="C"> <!-- interesting data indication information
includes the starting character of the string "Content-Length"-->
                <Refine-Match>Content-Length:</Refine-Match> <!-- Used for
precise Content-Length matching -->
                <SetIntValue Name="content_length"/>
            </Interesting>
            <Decision> <!-- the decision method, executed after 103 ends -->
                <Condition>is_rtsp_tunnel,content_length</Condition>
   <!-- If is_rtsp_tunnel is true, and content-length is 0, execute the atomic method
change_protocol, whose parameter is "RTSP", which indicates that the protocol is
switched to the RTSP -->
                <Rule action="change_protocol" parameter="RTSP">true,
zero</Rule>
   <!-- If is_rtsp_tunnel is false, and content-length is not 0, execute the atomic
method set_next_section, whose parameters are "LEN_TRACKING" and
"content_length", which indicate that the next section is section LEN_TRACKING,
and the section length is the numerical value stored by the variable content_length-->
                <Rule action="set_next_section" parameter="LEN_TRACKING,
content_length">false, non_zero </Rule>
            </Decision>
        </Section>
        <!-- Directly skip the section, whose name is LEN_TRACKING-->
        <Section name="LEN_TRACKING" type="skip_length"/>
    </Protocol>
    <!-- RTSP protocol configuration -->
    <Protocol Name="RTSP">
    <!-- Correspond to 104 -->
        <Section name="RTSP_FIRST_LINE" isFirst="true" type="PCREX"
next_section=""RTSP_HEADER"">
            <PCREX> RTSP/(\d\.\d)(?Fset(rtsp_ver, {-1}))) \d{3}
[a-zA-Z]+\r\n</PCREX> <!-- regular expression of first line of RTSP response -->
            <Output>rtsp_ver</Output> <!-- output the extracted RTSP version
number, correspond to 104 -->
        </Section>
    <!-- Correspond to 105 -->
        <Section name="RTSP_HEADER" type="fastscan">
            ....
            <Decision> <!-- decision method, executed after 105 ends -->
                <Condition>is_rtp,content_length</Condition>
                <Rule action="change_protocol" parameter="RTP">true,
zero</Rule>
                <Rule action="set_next_section" parameter="LEN_TRACKING,
content_length">false, non_zero </Rule>
            </Decision>
        </Section>
        .....
    </Protocol>
    <!-- RTP protocol configuration -->
    <Protocol Name="RTP">
        .....
    </Protocol>
```

The decision condition is all or a part of the interesting data acquired in this section. Table 1 in the following is an exemplary table (briefly referred to as a decision table) that stores decision conditions; in other words, it is a variable stable, and the decision conditions are these variable values.

To make the foregoing embodiment clearer, the variables in the decision table are briefly described as follows:

TABLE 1

| Variable name | Type | Initial value |
| --- | --- | --- |
| content-length | Integer | 0 |
| is_rtsp_tunnel | Boolean | false |
| is_rtp | Boolean | false |

With reference to FIG. 6 and the configuration file, the method for parsing a network message provided by the embodiment of the present invention is described in detail as follows:

A network server receives an HTTP request message sent by a client to a server; after identifying that an application protocol type of the message is the HTTP protocol, the network server searches the configuration file corresponding to the HTTP protocol for section description information 1, where section description information 1 includes a section name, that is, HTTP_FIRST_LINE_REQUEST, a section type, that is, a regular expression, information of a next section, that is, HTTP_REQ_HEADER, and interesting data indication information, that is, a URL; and scans the HTTP request message in the regular expression scanning method indicated by the section type in section description information 1, acquires, by using the interesting data indication information in section description information 1 and from the HTTP request message, interesting data indicated by the interesting data indication information until the section delimiter "r\n" is obtained by scanning. In this case, characters between a first character of the HTTP request message and the section delimiter are section 100. The interesting data indication information in the section is the URL, the interesting data obtained by scanning is "/sweet.3gp".

Because section description information 1 includes the information of the next section, which indicates that the next section is HTTP_REQ_HEADER, no decision is required, and the next section of the HTTP request message, that is, section 101, is directly processed by using section description information 2 of the application protocol, that is, section description information with the name "HTTP_REQ_HEADER".

The network server starts scanning from a character right behind section 100 in the fast scanning method indicated by the section type in section description information 2, and continues to scan, by using interesting data indication information in section description information 2, the network message for interesting data indicated the interesting data indication information until the section delimiter "\r\n\r\n" is obtained by scanning, where characters between the next section of section 100 to the section delimiter "\r\n\r\n" are section 101. The interesting data indication information in section description information 2 is "User-Agent" and "Content-Length", Content-Length indicates a length of a message body of the HTTP message, and User-Agent indicates a user browser agent. If "Content-Length" is not obtained by scanning in section 101, that is, the HTTP request message does not have a message body of an HTTP message, and because Content-Length is not obtained by scanning, Content-Length is 0, and therefore an atomic method executed in section 101 is end_of_message, which indicates that the message ends, and all flag bits and integer values in the foregoing Table 1 are reset to initial values.

The network server receives an HTTP response message, that is, "HTTP/1.0 200 OK", sent by the server to the client, searches the configuration file corresponding to the HTTP protocol for section description information 4, where section description information 4 includes a section name, that is, "HTTP_FIRST_LINE_RESPONSE", a section type, that is, the regular expression, and information of a next section, that is, "HTTP_RSP_HEADER", and acquires, by using interesting data indication information in section description information 4 and the regular expression indicated by the section type in section description information 4 and from the HTTP response message, interesting data indicated by the interesting data indication information until the section delimiter "r\n" is obtained by scanning. In this case, characters between a first character of the HTTP response message and the section delimiter are section 102 (where the current section 102 is a first line of the HTTP response message), and interesting data that needs to be extracted from the section is an HTTP version number according to the interesting data indication information in section description information 4. Because section description information 4 includes the information of the next section, which indicates that the next section is HTTP_RSP_HEADER, no decision is required, and the next section of the HTTP response message, that is, section 103, is directly processed by using section description information 5 of the application protocol (that is, section description information with the name "HTTP_RSP_HEADER").

The network server searches for section description information 5, and scans, by using interesting data indication information in section description information 5 and in a fast scanning method indicated by the section type in section description information 5, the HTTP response message for interesting data indicated by the interesting data indication information until the section delimiter "\r\n\r\n" is obtained by scanning, where a section separated by the section delimiter is section 103. The interesting data indication information in the section description information is "Content-Type" and "Content-Length". In this example, the header field "Content-Type" is obtained, by scanning, in section 103, whose header field value is precisely matched with a string "x-rtsp-tunnel", and if the matching succeeds, a value of the variable "is_rtsp_tunnel" is set to true (for example, the value of the variable "is_rtsp_tunnel" is recorded as true in the foregoing Table 1). Because "Content-Length" is not obtained by scanning, a value of the variable Content-Length is recorded as 0 (for example, the value of the variable Content-Length is recorded as 0 in the foregoing Table 1, or the value of the variable Content-Length in the foregoing Table 1 is not updated; it should be noted that, if the header field "Content-Length" is obtained, by scanning, in section 103, a header field value thereof is stored into the variable "content-length"), and then a decision method is executed by using "is_rtsp_tunnel" being true and the value of Content-Length being 0 as a decision condition, which is as follows:

```
</Decision>
    <Condition>is_rtsp_tunnel,content_length</Condition>
    <Rule action="change_protocol" parameter="RTSP">true, zero</Rule>
    <Rule action="set_next_section" parameter="LEN_TRACKING, content_length">false, non_zero </Rule>
</Decision>"
```

It can be seen that, when "is_rtsp_tunnel" is true, and the value of Content-Length is 0, a decided atomic method that is to be executed is "change_protocol", where the atomic method is switching the protocol type of the next network message to the RTSP. Therefore, the next network message transmitted between the client and the server is parsed by using the configuration file corresponding to the RTSP. The logical meaning is, because the header field value of Content-Length indicates that the message does not include a message body, it is not a protocol bearing relationship. Further, because the header field value of Content-Type indicates that the role of the HTTP message is an RTSP tunnel, a subsequent network message needs to be switched to the RTSP.

The network server receives an RTSP message, that is, "RTSP/1.0 200 OK" sent by the server to the client, searches the configuration file corresponding to the RTSP protocol for section description information 1, where section description information 1 includes: a section name, that is, RTSP_FIRST_LINE, a section type, that is, the regular expression, information of a next section, that is, "RTSP_HEADER", and interesting data indication information, and scans, in the regular expression scanning method indicated by the section type in section description information 1, the RTSP network message until the section delimiter "r\n" is obtained by scanning, where a section separated by the section delimiter "r\n" is section 104, and interesting data that needs to be extracted from the section is an RTSP version number according to the interesting data indication information in section description information 1. Because section description information 1 includes the information of the next section, which indicates that the next section is RTSP_HEADER, no decision is required, and the next section of the RTSP message, that is, section 105, is directly processed by using section description information 2 (where the section name is "RTSP_HEADER") in the configuration file corresponding to the RTSP protocol.

The network server continues to scan, in the fast scanning method indicated by the section type in section description information 2 corresponding to the RTSP protocol, the RTSP network message until the section delimiter "\r\n\r\n" is obtained by scanning, where a section separated by the section delimiter is section 105. If interesting data indication information in section description information 2 is obtained, by scanning, interesting data indicated by the interesting data indication information is extracted, for example, the interesting data indication information is "Vsrc", "Content-Type", and "Content-Length". In this example, "Vsrc", "Content-Type", and "Content-Length" are obtained, by scanning, in the section, and a header field value of "Content-Type" indicates switching the protocol to a session description protocol (SDP), where an SDP protocol message does not have interesting data, and may be ignored in this example. Because the header field value does not indicate a Real time Transport Protocol (RTP), a value of the variable "is_rtp" is a default value, and is kept as false. Because a value indicated by the header field value of "Content-Length" is 1903, a value of the variable Content-Length is recorded as 1903 (for example, the value of the variable Content-Length is recorded as 1903 in the foregoing Table 1), and then a decision method is executed by using the value of "is_rtp" being false and the value of "Content-Length" being 1903 as a decision condition, which is as follows:

```
</Decision>
    <Condition>is_rtp,content_length</Condition>
    <Rule action=" switch _protocol" parameter="RTP">true, zero</Rule>
    <Rule action="set_next_section" parameter="LEN_TRACKING, content_length">false, non_zero </Rule>
</Decision>
```

It should be noted that the foregoing decision method is applied to section 105 and section 108, and includes two pieces of interesting data and corresponding atomic methods. As can be seen, for section 105, it can be seen from the foregoing decision method that, when "is_rtp" is false and the value of Content-Length is not 0, such a decision is made: determining that a next section is a directly skipped section, and the number of characters that are directly skipped is 1903. Accordingly, the number of characters of a subsequent section 106 is 1903, and the network server directly skips the section without performing any processing on it.

Because no subsequent section exists after section 106 ends, it indicates that the RTSP message ends, and accordingly, the subsequent message is processed by using the section description information (that is, section description information 1 corresponding to the RTSP protocol) of the first section of the application protocol. Therefore, the processing method of section 107 is consistent with that of section 104.

Similarly, when section 108 is processed, it is found that a header field RTP-Info exists, and a protocol type needs to be switched to the RTP after a decision. Specifically, the network server continues to scan, in the fast scanning method indicated by the section type in section description information 2 corresponding to the RTSP protocol, the RTSP network message until the section delimiter "\r\n\r\n" is obtained by scanning, where a section separated by the section delimiter is section 108. If the interesting data indication information in section description information 2 is obtained by scanning, interesting data indicated by the interesting data indication information is extracted. In this example, "RTP-Info" is obtained, by scanning, in the section, and a header field value of "RTP-Info" is url=rtsp://10.13.4.3:554/sweet.3gp/, where the header field value may not be interesting data, and does not need to be involved in subsequent matching of the pre-defined policy either. Because the interesting data indication information indicates the RTP protocol, the value of the variable "is_rtp" is set to true, and then a decision method is executed by using the value of "is_rtp" being true and the value of "Content-Length" being 0 as a decision basis, which is as follows:

```
</Decision>
    <Condition>is_rtp,content_length</Condition>
    <Rule action=" switch _protocol" parameter="RTP">true, zero</Rule>
    <Rule action="set_next_section" parameter="LEN_TRACKING, content_length">false, non_zero </Rule>
</Decision>
```

The decision logic is, when "is_rtp" is true and the value of content-length is 0, switch the protocol to the RTP protocol. It should be noted that, in this example, because the header field Content-Length is not obtained by scanning, the value of content-length is 0.

It should be noted that, the given decision logic is applicable to this example only, and in an actual application, other variables used for making a decision may be used, and other decision methods may be used, which does not affect the implementation of the present invention.

In another specific embodiment, the decision result of the decision method is protocol switching or protocol bearing. Specifically, description information of a section in the configuration file may include the following content:

```
<EndSectionTreatment>
    <Parameters>HTTP_IS_RTSP,HTTP_IS_MIME,HTTP_IS_MMS,HTTP_IS_KJAVA</Parameters> <Decision action="switch_Protocol" protocol="RTSP">TRUE,FALSE,FALSE,FALSE</Decision>; indicate switching the protocol to the RTSP
    <Decisionaction="Embedded_Protocol"protocol="MIME">FALSE,TRUE,FALSE,FALSE</Decision>;
``` indicate that the protocol bears the Multipurpose Internet Mail Extensions protocol (MIME); a first Section of the MIME protocol is automatically skipped to in the next step, and after the whole MIME is processed, processing is continued by skipping back to the protocol <Decision action="Embedded_Protocol" protocol="MMS">FALSE,FALSE,TRUE,FALSE</Decision>; indicate that the protocol bears a multimedia service (MMS) protocol, a first Section of the MMS protocol is atomically skipped to in the next step, and after the whole MMS is processed, processing is continued by skipping back to the protocol <Decisionaction="Embedded_Protocol"protocol="KJAVA">FALSE,FALSE,FALSE, TRUE</Decision> indicate that the protocol bears a KJAVA protocol, a first Section of the KJAVA protocol is atomically skipped to in the next step, and after the whole KJAVA is processed, processing is continued by skipping back to the protocol
  </EndSectionTreatment>

Figure 7:
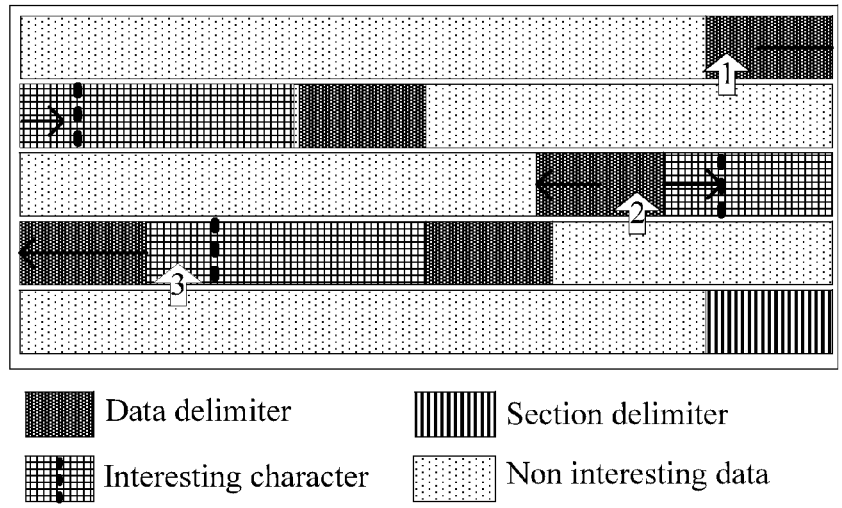
FIG. 7 is a schematic diagram of performing fast scanning on a section according to an embodiment of the present invention.
Figure 8:
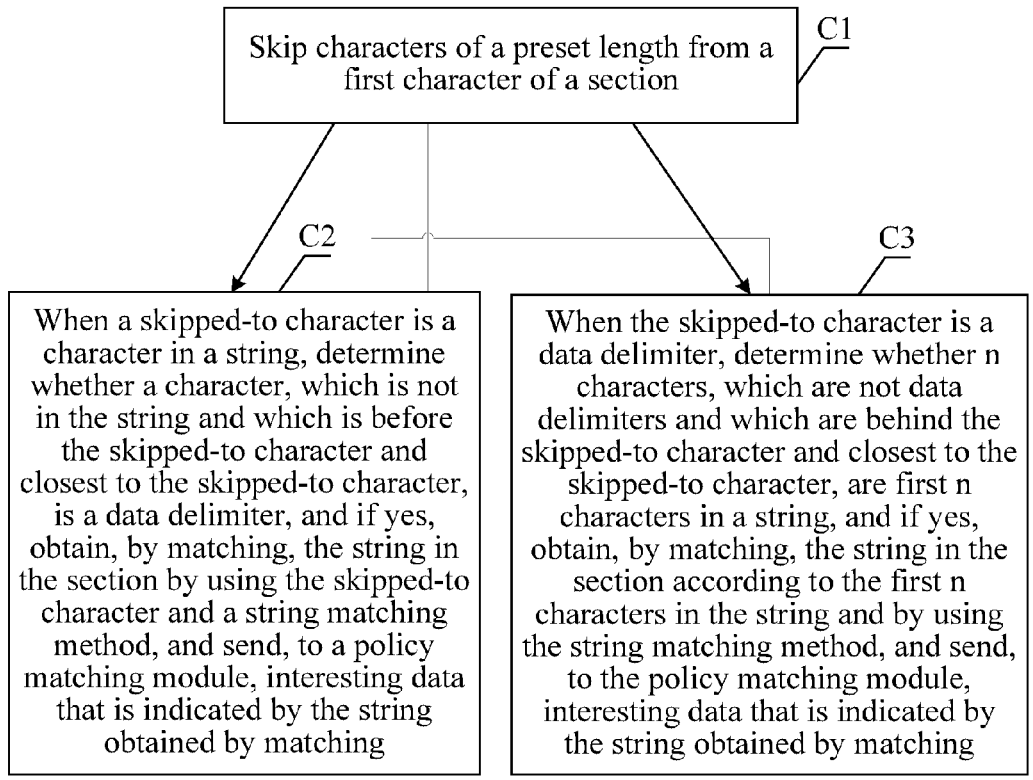
FIG. 8 is a flowchart of a fast scanning method according to an embodiment of the present invention.

FIG. 7 and FIG. 8 show a fast scanning method provided by an embodiment of the present invention, where the fast scanning method may be used for scanning interesting data indication information in a header field part, and the method specifically includes:

C1: Skip characters of a preset length from a first character of a section.

The section may be a header field part of a network message.

The preset length is decided by a length of a data delimiter in the section, where a longer data delimiter indicates a longer preset length. Generally, the preset length<the data delimiter+a length n of interesting characters. Interesting data indication information may be a string, and the interesting character is a character of a header of the string, which may be first n characters of the string, where n is greater than or equal to 1. For example, when n is equal to 2, the interesting characters include the first character and the second character of the string. The data delimiter may be recorded in section description information, and the data delimiter is different from a section delimiter, where the data delimiter is used for separating data in a same section, while the section delimiter is used for separating a section corresponding to the section description information from the network message, for example, separating an HTTP first line and an HTTP header field part from an HTTP network message. Specifically, the data delimiter may be "\r\n", while the section delimiter may be "\r\n\r\n". If the data delimiter is ""\r\n", and the number of interesting characters is one, the preset length may be three, that is, each time three characters are skipped.

C2: When a skipped-to character is a character in a string, determine whether a character, which is not in the string and which is before the skipped-to character and closest to the skipped-to character, is a data delimiter, and if it is determined that the character, which is not in the string and which is before the skipped-to character and closest to the skipped-to character, is a data delimiter, obtain, by matching, the string in the section by using the skipped-to character and a string matching method, send, to a policy matching module, interesting data that is indicated by the string obtained by matching, and end the process.

A string obtained, by matching, in the HTTP header field part may be "Content-Type" or "Content-Length".

C3: When the skipped-to character is a data delimiter, determine whether n characters, which are not data delimiters and which are behind the skipped-to character and closest to the skipped-to character, are the first n characters in the string, and if it is determined that the n characters, which are not data delimiters and which are behind the skipped-to character and closest to the skipped-to character, are the first n characters in the string, obtain, by matching, the string in the section according to the first n characters in the string and by using the string matching method, send, to the policy matching module, interesting data indicated by the string obtained by matching, and end the process.

n may be 1, 2, or any other numerical value, which does not affect the implementation of the present invention.

It should be noted that, the fast scanning method may be applicable to any protocol, which can be absolutely implemented by hardware, for example, implemented by an FPGA.

With reference to the foregoing example, the fast scanning method provided by the embodiment of the present invention is described in detail as follows:

For example, section 105 in FIG. 6 is:
RTSP/1.0 200 OK\r\n
CSeq: 1\r\n
Date: Wed, 31 Mar. 2004 01:18:50 GMT\r\n
Vsrc: http://10.13.4.3:8888/viewsource/eqDreA1\r\n
Last-Modified: Wed, 10 Mar. 2004 02:07:17 GMT\r\n
Content-base: rtsp://10.13.4.3:554/sweet.3gp/\r\n
Vary: User-Agent, ClientID\r\n
Content-type: application/sdp\r\n
Content-length: 1903 \r\n\r\n Assuming that the interesting characters are V and C, that is, the first characters of strings "Vsrc" and "Content-type", the preset length for skipping characters each time is three, the data delimiter is "r\n", and when Content-type is scanned, the following cases may occur:

1. If the skipped-to character is "\r" before Content-Type, in this case, it is required to check whether two following characters are "\n" and "C", and if the two following characters are "\n" and "C", precise matching is performed on the remaining characters "Content-Type", where the string matching method may specifically be used for the matching, and if the matching succeeds, interesting data indicated by Content-Type is output to the policy matching module, that is, "application/sdp" is output to the policy matching module.

2. If the skipped-to character is "\n" before Content-Type, in this case, it is required to check whether a following character is "C" and whether a preceding character is "\r", and if the following character is "C" and the preceding character is "\r", precise matching is performed on the remaining characters "Content-Type", where the string matching method may specifically be used for the matching, and if the matching succeeds, interesting data indicated by Content-Type is output to the policy matching module.

3. If the skipped-to character is "C", in this case, it is required to check whether two preceding characters are "\r" and "\n", and if the two preceding characters are "\r" and "\n", precise matching is performed on the remaining characters "Content-Type", where the string matching method may specifically be used for the matching, and if the matching succeeds, interesting data indicated by Content-Type is output to the policy matching module.

Description is provided in the foregoing by using an example that the interesting character is one character. The interesting characters may also be two characters, that is, the first two characters of a string: "Co" and "Vs".

Figure 9:
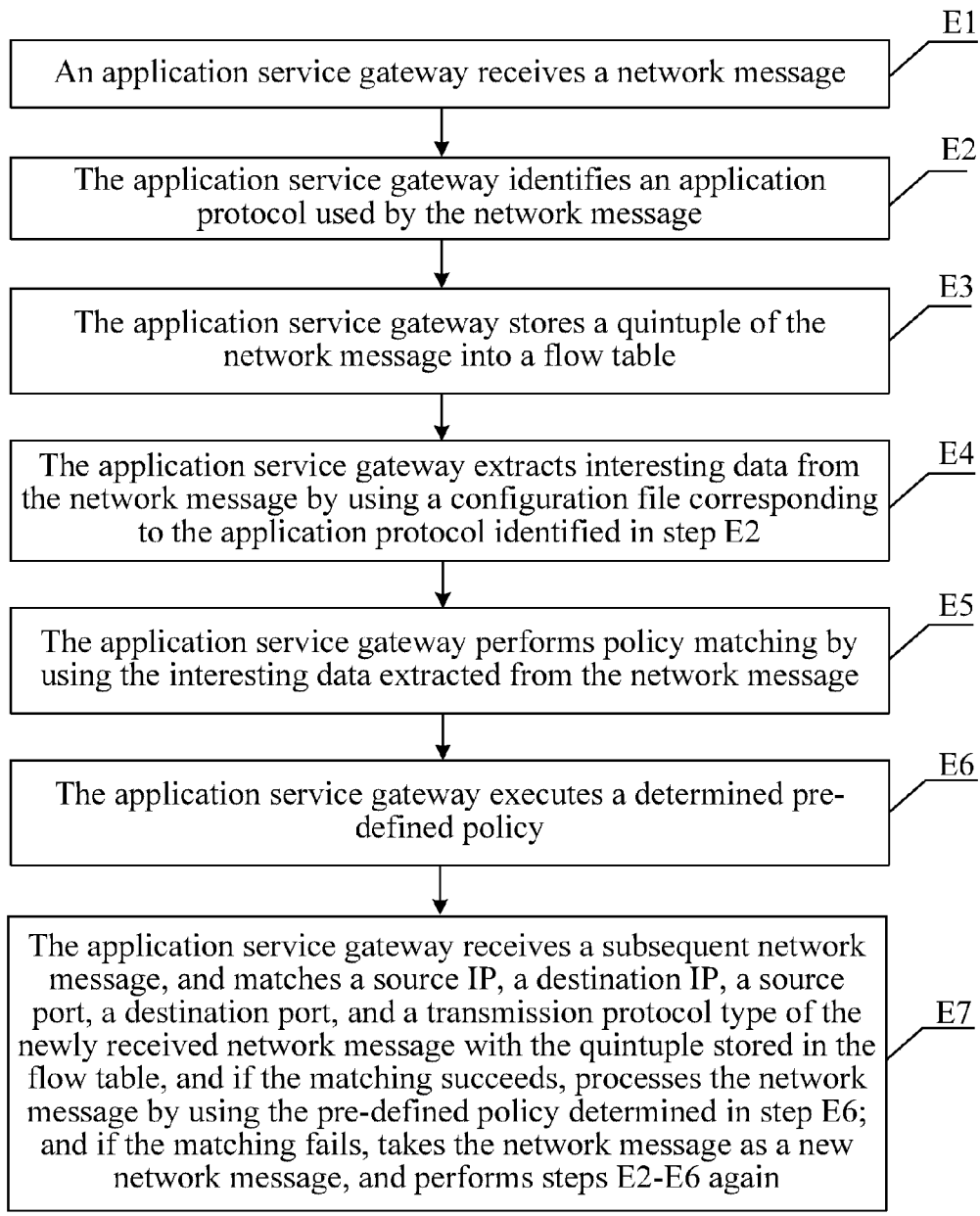
FIG. 9 is a flowchart of network message processing according to an embodiment of the present invention.

The method for parsing a network message provided by the embodiment of the present invention may be applied to a fixed network, an access network of a mobile network, and various gateway devices of a core network, for example, may be used on an application service gateway, which functions to acquire interesting data in a network message and implement various pre-defined policies for the network message, for example, policies such as blocking, traffic limiting, redirecting, and content-based charging. FIG. 9 shows a process of an application service gateway in processing multiple network messages, which specifically includes:

E1: An application service gateway receives a network message.

Specifically, a client logs in to a radio access network by means of authentication by using a UE, acquires an IP address of an application server from a core network, and then sends a network message to the application server.

E2: The application service gateway identifies an application protocol used by the network message.

Specifically, a TCP/UDP port identification method, a feature field identification method, or a protocol behavior identification method may be used.

E3: The application service gateway stores a quintuple of the network message into a flow table.

The quintuple of the network message includes a source IP, a destination IP, a source port, a destination port, and a transmission protocol type, where the transmission protocol type may be the TCP or the UDP. The application service gateway stores the source IP, the destination IP, the source port, the destination port, and the transmission protocol type of the network message into the flow table.

E4: The application service gateway extracts interesting data from the network message by using a configuration file corresponding to the application protocol identified in step E2.

The method for the application service gateway to extract the interesting data from the network message is specifically: searching for the interesting data in a corresponding section of the network message according to the configuration file corresponding to the application protocol and in a regular expression method or a fast scanning method; executing a decision method by using the found interesting data as a decision basis, and deciding a next section of the network message or a processing method of a next network message, and further searching for interesting data in the next section or the next network message in the regular expression method or the fast scanning method. Reference may be made to the corresponding description of the embodiment corresponding to FIG. 5 for the specific implementation manner, which is not repeatedly described herein.

E5: The application service gateway performs policy matching by using the interesting data extracted from the network message.

A pre-defined policy include policies such as blocking, traffic limiting, redirecting, and charging.

E6: The application service gateway executes a determined pre-defined policy.

For example, for the network message shown in FIG. 6, the application service gateway obtains a URL "/sweet.3gp" by parsing when processing section 101, but fails to determine any policy by using the URL only, until the header field RTP-Info is obtained by matching when the application service gateway processes section 108; and the application service gateway learns, by using the header field RTP-Info and "/sweet.3gp", that what is exchanged between the server and the client is a video file, and obtains, by matching, the charging policy, so that charging for content in section 109 may be performed subsequently.

E7: The application service gateway receives a subsequent network message, and matches a source IP, a destination IP, a source port, a destination port, and a transmission protocol type of the newly received network message with the quintuple stored in the flow table, and if the matching succeeds, processes the network message by using the pre-defined policy determined in step E6; and if the matching fails, takes the network message as a new network message, and performs steps E2-E6 again, which are not repeatedly described herein.

In this embodiment, network messages between the client and the server can be parsed and the pre-defined policy can be obtained by matching, so as to perform processing, such as charging, on communication between the client and the server by using the pre-defined policy.

Figure 10A:
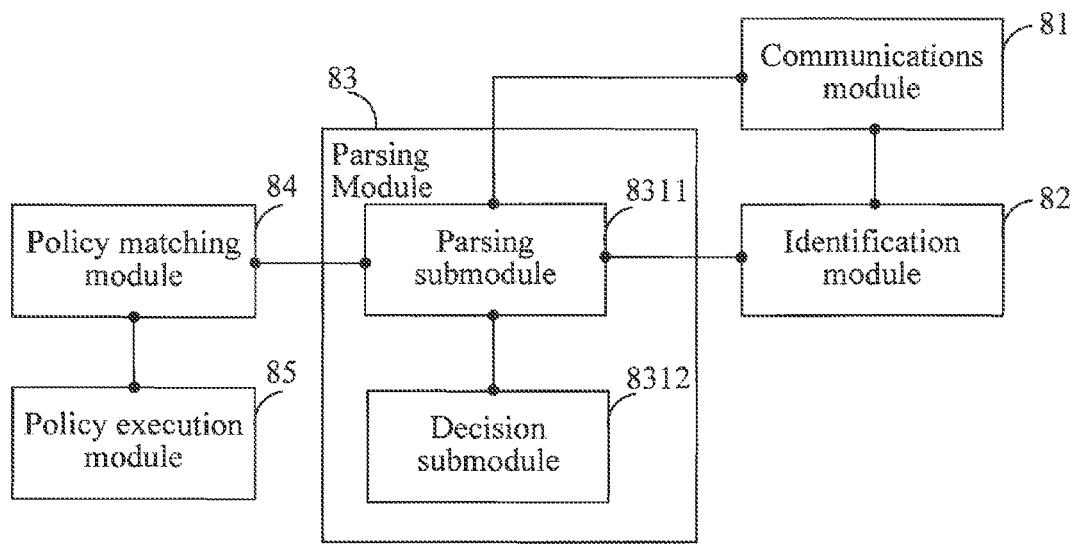
FIG. 10A is a structural diagram of a communication device according to an embodiment of the present invention.
Figure 10B:
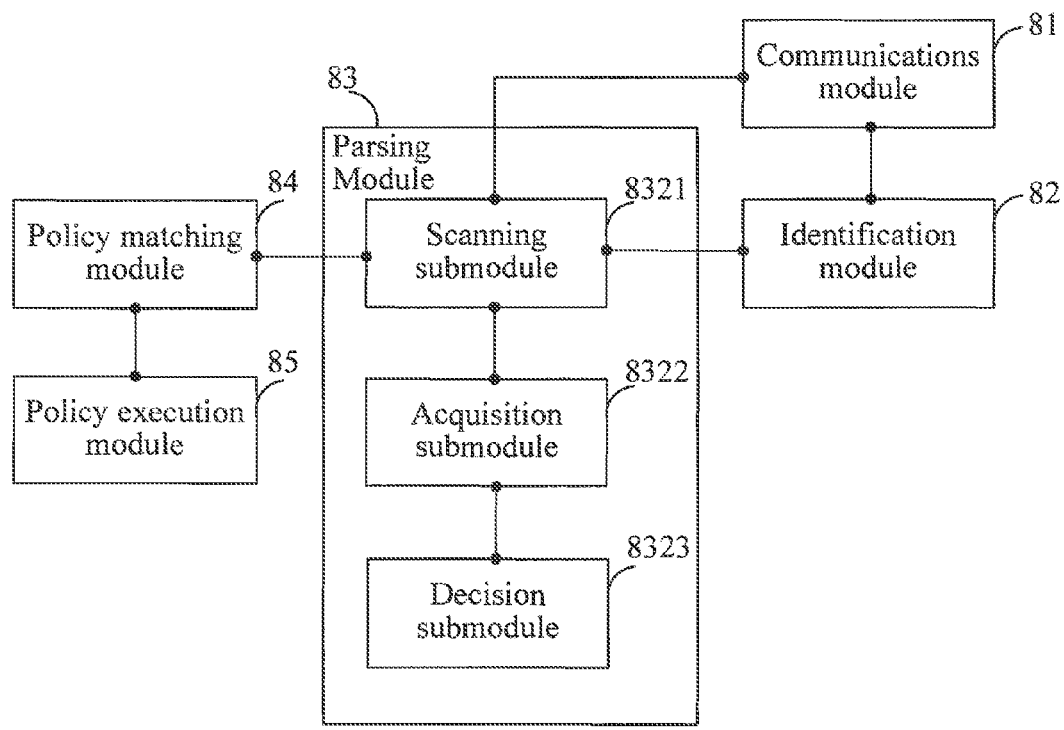
FIG. 10B is a structural diagram of another communication device according to an embodiment of the present invention.

Referring to FIG. 10A and FIG. 10B, an embodiment of the present invention provides a communication device, where the communication device may include: a communications module 81 configured to receive a network message, where the network message includes one or more sections; an identification module 82 configured to identify that an application protocol type of the network message is a first application protocol; and a parsing module 83 configured to acquire, from a current section that is in the network message and that is described by a piece of section description information in a configuration file corresponding to the first application protocol, interesting data indicated by interesting data indication information in the section description information; and execute a decision method in the section description information by using all or a part of the acquired interesting data as a decision condition, thereby obtaining a corresponding decision result, wherein when the current section is a last section of the network message, the decision result includes a processing method of a next message of the network message and both the network message and the next message belong to a same application layer.

Referring to FIG. 10A, the parsing module 83 includes: a parsing submodule 8311 configured to acquire, from the current section that is in the network message and that is described by the section description information in the configuration file corresponding to the first application protocol, the interesting data indicated by the interesting data indication information in the section description information; and a decision submodule 8312 configured to execute the decision method in the section description information by using all or a part of the acquired interesting data as the decision condition, thereby obtaining a corresponding decision result, where the decision method indicates that different atomic methods are executed according to different decision conditions; and the decision condition includes one or more pieces of interesting data.

In an implementation manner, the interesting data indication information includes: first indication information that indicates protocol type information of a next section and second indication information that indicates length information of the next section, and the acquired interesting data includes the protocol type information and the length information, where correspondingly, the parsing module 83 includes: a parsing submodule 8311, specifically configured to acquire, from the current section that is in the network message and that is described by the section description information in the configuration file corresponding to the first application protocol, the interesting data indicated by the interesting data indication information in the section description information, where the interesting data indication information includes: the first indication information that indicates protocol type information of the next section and the second indication information that indicates the length information of the next section, and the acquired interesting data includes the protocol type information and the length information; and a decision submodule 8312, specifically configured to obtain, by decision, a corresponding decision result by using the protocol type information and the length information as the decision condition, where the length information indicates that the current section is the last section, the decision result includes: an atomic method of changing a protocol type of a first section of the next message, and the protocol type of the first section of the next message is a protocol type indicated by the protocol type information.

Alternatively, in another implementation manner, the interesting data indication information includes: first indication information that indicates protocol type information of a next section, and the acquired interesting data includes the protocol type information, where correspondingly, the parsing module 83 includes: a parsing submodule 8311, specifically configured to acquire, from the current section that is in the network message and that is described by the section description information in the configuration file corresponding to the first application protocol, the interesting data indicated by the interesting data indication information in the section description information, where the interesting data indication information includes: the first indication information that indicates protocol type information of the next section, and the acquired interesting data includes the protocol type information; and a decision submodule 8312, specifically configured to obtain, by decision, a corresponding decision result by using the protocol type information as the decision condition, where the decision result includes an atomic method of changing a protocol type of a first section of the next message, where the protocol type of the first section of the next message is a protocol type indicated by the protocol type information. In this case, the first indication information may a header field Content-Type, and interesting data indicated by the first indication information is a specific protocol type located behind the header field. Alternatively, the first indication information is a header field RTP-info, and interesting data indicated by the first indication information is the RTP.

In another implementation manner, the parsing module is further configured to, when the current section is not the last section of the network message, the decision result indicates a processing method of the next section of the current section.

It should be understood that, the decision result involved in the embodiment of the present invention may be represented by an atomic method and a parameter required by the atomic method, where the atomic method includes any one or a combination of the following: an atomic method of setting the next section, an atomic method of changing the protocol type of the first section of the next message, an atomic method of setting the protocol type of the next section, and an atomic method of setting a decoding algorithm that needs to be performed before the next section is to be processed. For the description of functions implemented by these atomic methods, refer to corresponding description in the method embodiments, which is not repeatedly described herein. It should be particularly noted that, when the current section is not the last section of the network message, the corresponding decision result may be indicated by any one or a combination of the following: the atomic method of setting the next section, the atomic method of setting the protocol type of the next section, and the atomic method of setting the decoding algorithm that needs to be performed before the next section is to be processed, and a specific atomic method is determined according to a specific decision condition.

In an implementation manner, the interesting data indication information includes first indication information that indicates protocol type information of the next section, and the acquired interesting data includes the protocol type information, where correspondingly, the parsing module 83 includes a parsing submodule 8311, specifically configured to acquire, from the current section that is in the network message and that is described by the section description information in the configuration file corresponding to the first application protocol, the interesting data indicated by the interesting data indication information in the section description information, where the interesting data indication information includes the first indication information that indicates protocol type information of the next section, and the acquired interesting data includes the protocol type information; and a decision submodule 8312, specifically configured to obtain, by decision, a corresponding decision result by using the protocol type information as the decision condition, where the decision result includes the atomic method of setting the protocol type of the next section, where the protocol type of the next section is a protocol type indicated by the protocol type information.

In another implementation manner, the interesting data indication information includes: second indication information that indicates length information of the next section, and the acquired interesting data includes the length information, where correspondingly, the parsing module 83 includes a parsing submodule 8311, specifically configured to acquire, from the current section that is in the network message and that is the section description information in the configuration file corresponding to the first application protocol, the interesting data indicated by the interesting data indication information in the section description information, where the interesting data indication information includes the second indication information that indicates length information of the next section, and the acquired interesting data includes the length information; and a decision submodule 8312, specifically configured to obtain, by decision, the corresponding decision result by using the length information as the decision condition, where the decision result includes an atomic method of setting the next section as a section with a preset length directly skipped, and the preset length is a length indicated by the length information. The section with the preset length directly skipped may be LEN_TRACKING in the configuration file corresponding to FIG. 6. For specific implementation, refer to corresponding description of the method embodiments.

In another implementation manner, the interesting data indication information includes third indication information that indicates encoding and decoding information of the next section, and the acquired interesting data includes the encoding and decoding information, where correspondingly, the parsing module 83 includes a parsing submodule 8311, specifically configured to acquire, from the current section that is in the network message and that is described by the section description information in the configuration file corresponding to the first application protocol, the interesting data indicated by the interesting data indication information in the section description information, where the interesting data indication information includes the third indication information that indicates encoding and decoding information of the next section, and the acquired interesting data includes the encoding and decoding information; and a decision submodule 8312, specifically configured to obtain, by decision, a corresponding decision result by using the encoding and decoding information as the decision condition, where the decision result includes: an atomic method of setting a decoding algorithm that needs to be performed before the next section is to be processed, where the decoding algorithm that needs to be performed before the next section is to be processed is a decoding algorithm indicated by the encoding and decoding information. An encoding and decoding type may be base64 and the like.

For the structure of the configuration file in this embodiment, refer to a corresponding description of the foregoing method embodiments, and details are not repeatedly described herein. The foregoing multiple implementation manners may be implemented separately, or implemented in combination with each other, which does not affect the implementation of the present invention.

Specifically, the section description information includes: a section name, a section type, the interesting data indication information, and the decision method, where the section type indicates a scanning method used by the current section, which may specifically be a fast scanning method, a regular expression scanning method, or the like. Referring to FIG. 10B, in an implementation manner, the parsing module 83 includes: a scanning submodule 8321 configured to scan, in a scanning method indicated by the section type, the current section corresponding to the section name for the interesting data indication information; an acquiring submodule 8322 configured to acquire the interesting data that is indicated by the interesting data indication information obtained by scanning; and a decision submodule 8323 configured to execute the decision method in the section description information by using all or a part of the interesting data, thereby obtaining the corresponding decision result.

Figure 11:
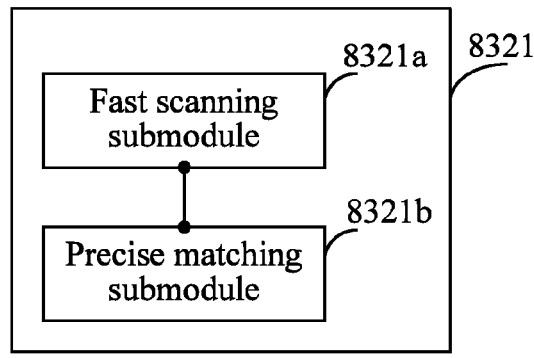
FIG. 11 is a structural diagram of a scanning submodule in a communication device according to an embodiment of the present invention.

To further improve the parsing efficiency, the embodiment of the present invention further provides a fast scanning technology. Referring to FIG. 11, the scanning submodule 8321 includes: a fast scanning submodule 8321a configured to skip characters of a specific length from a first character of the current section corresponding to the section name, and when a skipped-to character is a data delimiter, determine whether n characters, which are not data delimiters and which are behind the skipped-to character and closest to the skipped-to character, are first n characters in the interesting data indication information, where n is greater than or equal to 1; and when the skipped-to character is a character in the interesting data indication information, determine whether a character, which is not in the interesting data indication information and which is before the skipped-to character and closest to the skipped-to character, is a data delimiter; and a precise matching submodule 8321b configured to, when it is determined that the n characters, which are not data delimiters and which are behind the skipped-to character and closest to the skipped-to character, are the first n characters in the interesting data indication information, obtain, by matching, the interesting data indication information in the current section according to the first n characters in the interesting data indication information; and when it is determined that the character, which is not in the interesting data indication information and which is before the skipped-to character and closest to the skipped-to character, is the data delimiter, obtain, by matching, the interesting data indication information from the current section by using the skipped-to character. Reference may be made to the embodiment corresponding to FIG. 7 and FIG. 8 for the specific operations of the scanning submodule.

To implement management, such as blocking and charging, on a network message between a first device and a second device, the communication device may further include a policy matching module 84 and a policy execution module 85, where the policy matching module 84 is configured to determine a pre-defined policy applicable to the network message by using the interesting data; and the policy execution module 85 is configured to perform, by using the pre-defined policy, an operation on a data flow where the network message is located. The pre-defined policy may be a charging policy or the like.

It should be noted that, the communication device in the embodiment of the present invention may be any gateway device applied to an access network or a core network of a mobile network, and an access network or a core network of a fixed network, and may specifically be but not limited to an application service gateway. The technical solution of the present invention may serve as a support technology for implementing functions of gateway devices, such as traffic control, content-based charging, content adaptation, network security protection, radio signaling storm suppression, and load sharing functions.

In the embodiment of the present invention, interesting data in a section is acquired by using a header field in section description information in a configuration file and used by the section, a decision method is executed by using the interesting data, and a processing method of a next section or a next message is decided. In this way, if a method for parsing a network message changes, interesting data indication information and/or the decision method described in the section description information may be modified for implementation; and if a parsing capability for a new application protocol needs to be added, only a configuration file of the new application protocol needs to be added, instead of resetting logic for implementation, so that hitless upgrade can be implemented.

Figure 12:
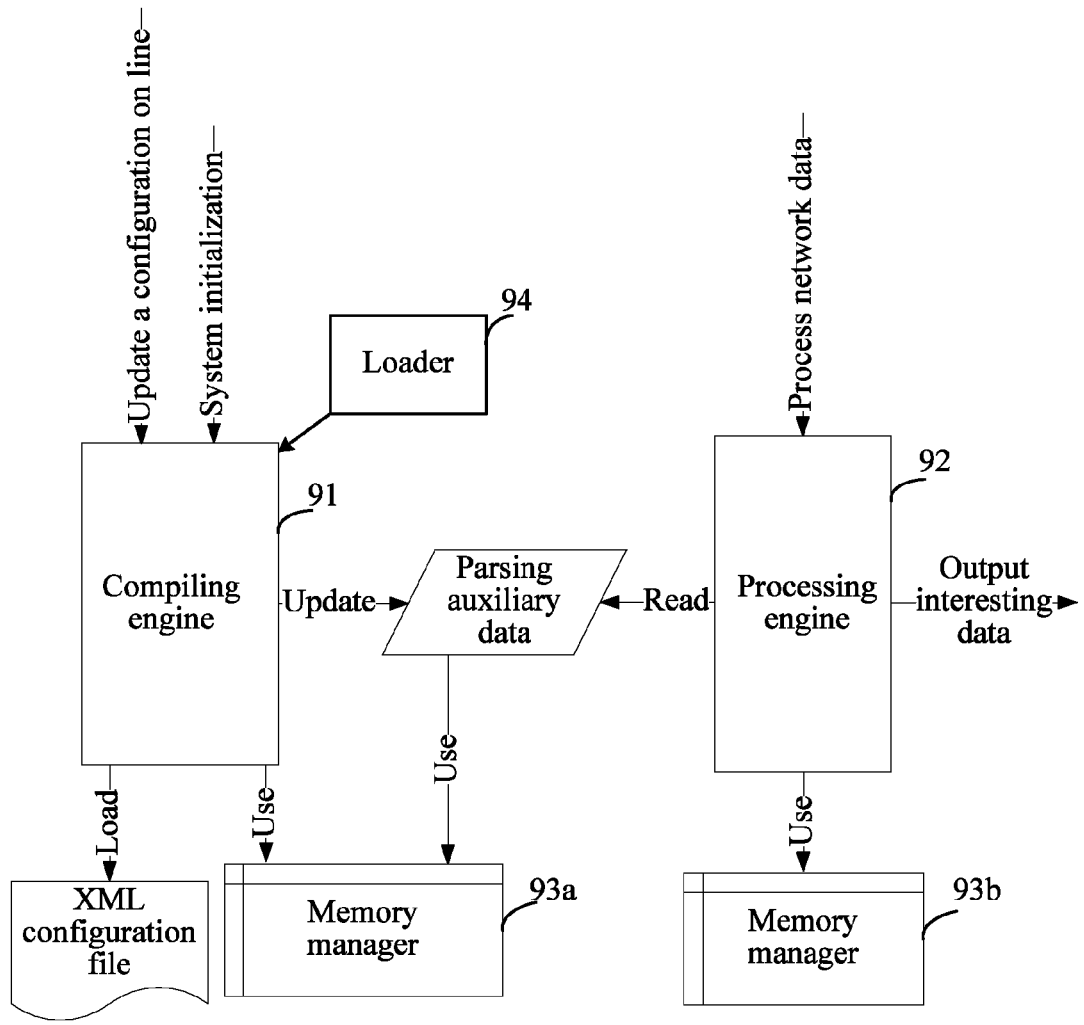
FIG. 12 is a structural diagram of a parsing system according to an embodiment of the present invention.

FIG. 12 shows a parsing system provided by an embodiment of the present invention, which includes a compiling engine 91 and a processing engine 92.

The compiling engine 91 is configured to compile a configuration file into protocol parsing auxiliary data that can be identified by the processing engine, where different application protocol types correspond to different configuration files.

In an implementation manner, the compiling engine 91 supports loading the configuration file during system initialization, and also supports updating the configuration file when the system is online.

The processing engine 92 is configured to receive a network message, where the network message includes one or more sections; identify that an application protocol type of the network message is a first application protocol; acquire, from a current section that is in the network message and that is described by section description information in protocol parsing auxiliary data corresponding to the first application protocol, interesting data indicated by interesting data indication information in the section description information; and execute a decision method in the section description information by using all or a part of the acquired interesting data as a decision condition, thereby obtaining a decision result, wherein when the current section is a last section of the network message, the decision result includes a processing method of a next message of the network message and both the network message and the next message belong to a same application layer.

It should be understood that, after the processing engine 92 obtains the decision result by decision, the decision result is represented by an atomic method and a parameter required by execution of the atomic method; in other words, after deciding the atomic method and the parameter, the processing engine 92 executes the atomic method.

The configuration file corresponding to the application protocol includes one or more pieces of section description information, and the section description information includes a section name, a section type, the interesting data indication information, and the decision method, where the section type indicates a scanning method used by a section; and the interesting data indication information includes any one or a combination of the following: first indication information that indicates protocol type information of a next section, second indication information that indicates length information of the next section, and third indication information that indicates encoding and decoding information of the next section.

The decision method indicates that different atomic methods are executed according to different decision conditions; the atomic method includes any one or a combination of the following: setting the next section, setting a protocol type of the next section, setting a length of the next section, determining that a complete message ends, changing a protocol type of a current data flow, and setting a decoding algorithm that needs to be performed before the next section is to be processed.

To implement reasonable content management, the parsing system further includes a memory manager 93 (which is shown as 93a and 93b in the figure) configured to manage a memory used by the compiling engine and processing engine, where the compiling engine and the processing engine use different memory areas or a same memory area. In an implementation manner, the memory used by the compiling engine 91 and processing engine 92 are separately managed by deploying different memory managers.

To load the configuration file, the parsing system further includes a loader 94 configured to read the configuration file from an internal storage device or external storage device and load the configuration file into the compiling engine 91.

Figure 13:
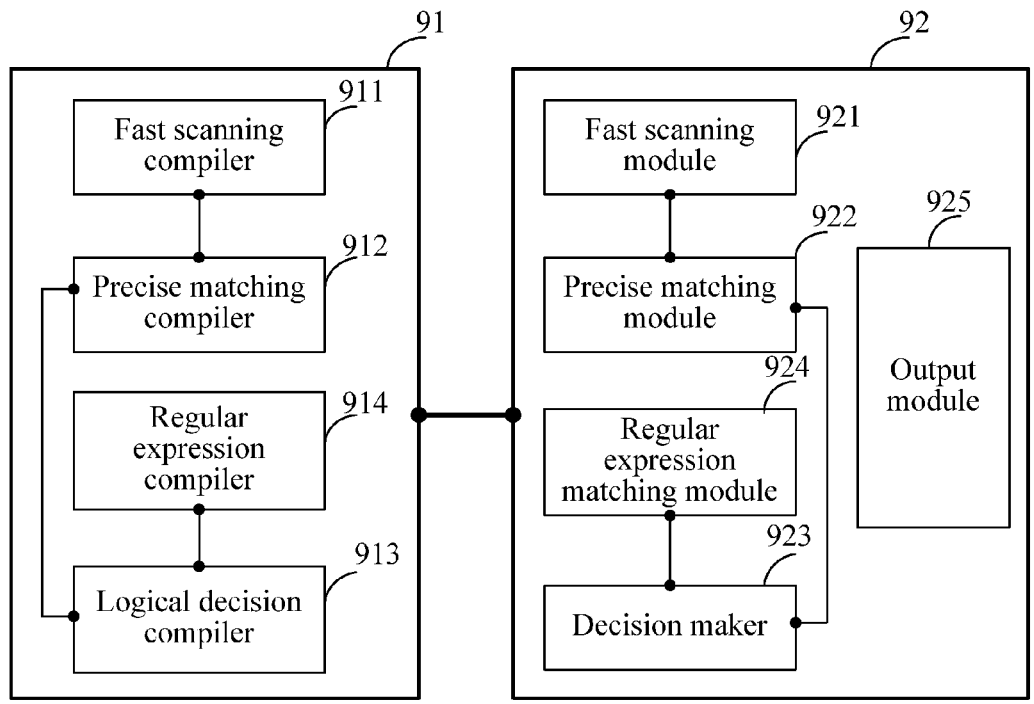
FIG. 13 is a structural diagram of a compiling engine and a processing engine in a parsing system according to an embodiment of the present invention.

As shown in FIG. 13, to compile the configuration file into machine-readable protocol parsing auxiliary data, the compiling engine 91 may include: a fast scanning compiler 911 configured to compile a header field in each section described in the configuration file into machine-readable protocol parsing auxiliary data, and output a fast scanning table, where the fast scanning table includes first n characters of the header field and protocol parsing auxiliary data corresponding to a data delimiter in the section; a precise matching compiler 912 configured to compile a multi-mode matching algorithm into machine-readable protocol parsing auxiliary data; and a logical decision compiler 913 configured to compile the decision method in the configuration file into machine-readable protocol parsing auxiliary data; and may further include a regular expression compiler 914 configured to compile a regular expression into machine-readable protocol parsing auxiliary data, so that when the section type indicates that the scanning method used by the section is a regular expression scanning method, the processing engine 92 searches a corresponding section for interesting data indication information by using the compiled protocol parsing auxiliary data.

As shown in FIG. 13, the processing engine 93 may include: a fast scanning module 921 configured to skip characters of a specific length from a first character of the current section corresponding to the section name, determine whether a skipped-to character is a data delimiter or a character in the first n characters in the interesting data indication information according to the fast scanning table, and when the skipped-to character is the data delimiter, determine whether n characters, which are not data delimiters and which are behind the skipped-to character and closest to the skipped-to character, are the first n characters in the interesting data indication information; and when the skipped-to character is the character in the first n characters in the interesting data indication information, determine whether a character, which is not in the interesting data indication information and which is before the skipped-to character and closest to the skipped-to character, is a data delimiter, where n is greater than or equal to 1; a precise matching module 922 configured to, when it is determined that the n characters, which are not data delimiters and which are behind the skipped-to character and closest to the skipped-to character, are the first n characters in the interesting data indication information, execute the compiled multi-mode matching algorithm in the protocol parsing auxiliary data according to the first n characters in the interesting data indication information, so as to obtain, by matching, the interesting data indication information in the current section; and when it is determined that the character, which is not in the interesting data indication information and which is before the skipped-to character and closest to the skipped-to character, is the data delimiter, execute the compiled multi-mode matching algorithm in the protocol parsing auxiliary data by using the skipped-to character, so as to obtain, by matching, the interesting data indication information in the current section; and a decision maker 923 configured to acquire, according to the interesting data indication information obtained by matching, the interesting data indicated by the interesting data indication information, and execute the decision method in the compiled section description information in the protocol parsing auxiliary data by using all or a part of the interesting data, thereby obtaining a decision result.

The processing engine 92 may further include a regular expression matching module 924 configured to, when the section type indicates that the scanning method used by the section is the regular expression scanning method, search a corresponding section for interesting data indication information by using protocol parsing auxiliary data corresponding to the regular expression.

To enable an external module to obtain, by matching, a pre-defined policy by using the interesting data, the processing engine 92 further includes an output module 925 configured to output the acquired interesting data to outside, which may be specifically output to a policy matching module. The policy matching module determines the pre-defined policy applicable to the network message by using the interesting data that is acquired by the processing engine, and then a policy execution module operates, by using the pre-defined policy, a data flow where the network message is located.

To quickly determine an application protocol type of a subsequent network message, the parsing system further includes a TCP/UDP flow table management module (not shown in the figure) configured to maintain correspondence between a quintuple of the network message and the first application protocol type, where the quintuple of the network message includes: a source IP, a destination IP, a source port, a destination port, and a transmission protocol type, and the transmission protocol type may be the TCP or the UDP. If a network message matching the quintuple is received subsequently, it is directly determined that the network message uses the application protocol type corresponding to the quintuple.

The TCP/UDP flow table management module is further configured to record correspondence between the quintuple and the pre-defined policy. If a network message matching the quintuple is received subsequently, the pre-defined policy is directly used for the network message.

The configuration file may be stored in a computer medium; when the system is started or runs normally, content of the configuration file may be loaded again, and is compiled into a data structure form that can be read directly by computer (compiled from a human readable format to a computer readable format; various data structures such as a structure body, a linked list, and an array), and stored in computer memory for reading in protocol processing. The format of the file may use any format, such as XML, that can describe the foregoing information. The loading and compiling processes of the configuration file are separated from the data processing process, and the configuration file is not an explanatory script.

Figure 14:
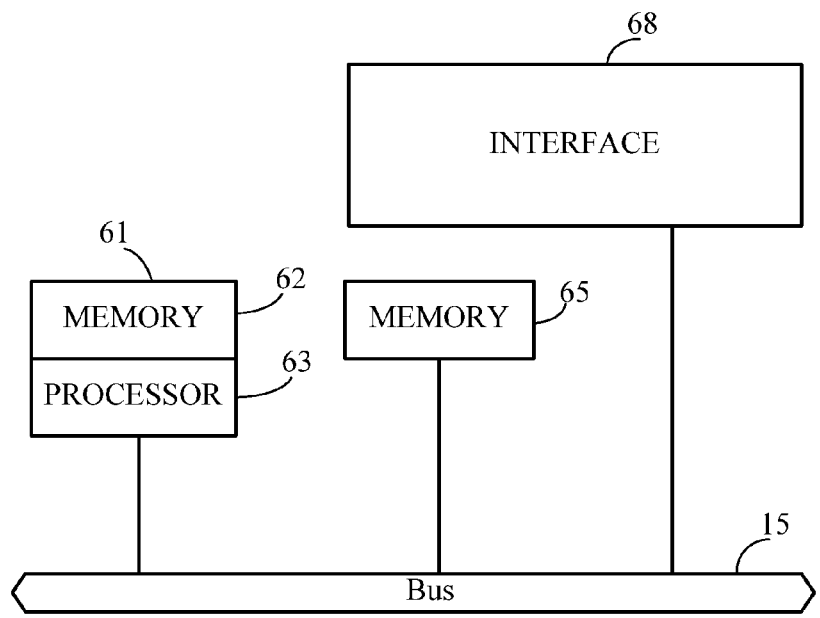
FIG. 14 is a structural diagram of a computer system according to an embodiment of the present invention.

FIG. 14 is a schematic structural diagram of a computer system according to an embodiment of the present invention. It should be understood that the following introduces a case that the parsing system of the embodiment of the present invention is deployed in a computer.

1. All software processing logic code is loaded from a memory 62 to a processor 63 at a system initialization stage. Meanwhile, a data structure of information of each section of a configuration file after parsing is stored in a memory 65.

2. When receiving a network message from an interface 68, the system directly writes the network message into the memory 65 by using a system bus 15, and notifies, by using an interrupt technology, the processor 63 that a network message event is received.

3. The processor 63 starts to process the network message in the memory 65 by using software logic, including steps, such as application protocol identification and parsing, mentioned in the present invention.

4. After the processing is complete, the network message is returned from the memory 65 back to the interface 68 through the system bus 15, and is sent to a next-hop device on the network, or is directly discarded due to application of a discard policy instead of being sent to the next-hop device.

It should be noted that all or a part of interesting data acquired from the current section is used as a decision basis, and the information may be stored in the computer memory.

In conclusion, in the embodiment of the present invention, network messages of various protocol types and corresponding processing methods are described by using configuration files, which greatly improves the processing capability while obtaining high flexibility.

The flexibility lies in that:

1. The description capability of the configuration file is not limited to a format of a specific protocol. Complicated logic such as protocol switching and pre-encoding and pre-decoding may further be supported, but the logic of the configuration file is concise.

2. In the case of describing a network data processing method by using the configuration file, when a new protocol data processing requirement occurs, or a supported protocol data processing method is switched, only the configuration file needs to be modified for implementation, with no need to modify a program, that is, the protocol data processing capability can be improved by loading the configuration file again.

The high performance lies in that:

In the case of using the fast scanning technology, the parsing speed is related to a length of a delimiter, with no need to skip only one character each time, thereby obtaining higher performance.

A person of ordinary skill in the art should understand that all or part of the steps of the method embodiments may be implemented by a program instructing relevant hardware. The foregoing program may be stored in a computer readable storage medium. When the program is run, the steps of the foregoing method embodiments are performed. The storage medium includes: any medium that can store program code, such as a read-only memory (ROM), a random access memory (RAM), a magnetic disk, or an optical disc.

The foregoing describes, in detail, the method for parsing a network message and the communication device provided by the embodiments of the present invention. Although the principles and implementation manners of the present invention are described by using specific examples in this specification, the descriptions of the embodiments are only intended to help understand the method and core ideas of the present invention. In addition, a person of ordinary skill in the art may make modifications to the specific implementation manners and application scopes according to the ideas of the present invention. To conclude, the content of the specification should not be construed as a limitation to the present invention.

What is claimed is:

1. A method for parsing a network message implemented in a network device comprising:

maintaining configuration files corresponding to different application protocol types;

receiving a network message, wherein the network message comprises one or more sections;

identifying that an application protocol type of the network message is a first application protocol;

acquiring interesting data indicated by an interesting data indication information in a section description information from a current section that is in the network message and that is described by a piece of the section description information in one of the configuration files corresponding to the first application protocol; and executing a decision method in the section description information using all or a part of the acquired interesting data as a decision condition to obtain a decision result, wherein the decision result comprises a processing method of a next message of the network message when the current section is a last section of the network message, wherein both the network message and the next message belong to a same application layer, wherein the decision method indicates that different atomic methods are executed according to different decision conditions, wherein the decision condition comprises one or more pieces of interesting data, wherein the acquired interesting data comprises a protocol type information of the next section when the interesting data indication information comprises first indication information that indicates protocol type information of the next section, wherein the decision result comprises an atomic method of changing a protocol type of a first section of the next message when the protocol type information is used as the decision condition, and wherein the protocol type of the first section of the next message is a protocol type indicated by the protocol type information.

2. The method according to claim 1, wherein the interesting data indication information is a header field name and the interesting data indicated by the interesting data indication information is a header field value located behind a corresponding header field.

3. The method according to claim 1, wherein the decision method indicates that different atomic methods are executed according to different decision conditions, wherein the decision condition comprises one or more pieces of interesting data, and wherein the decision result comprises a parameter required by execution of the following atomic method: setting a next section.

4. The method according to claim 1, wherein the interesting data indication information is a header field name and the interesting data indicated by the interesting data indication information is interesting data indicated by the header field name.

5. The method according to claim 1, wherein the interesting data indication information is an attribute name and the interesting data indicated by the interesting data indication information is an attribute value.

6. The method according to claim 1, wherein the decision result indicates a processing method of a next section of the current section when the current section is not the last section of the network message.

7. The method according to claim 6, wherein the decision method indicates that different atomic methods are executed according to different decision conditions, wherein the decision condition comprises one or more pieces of interesting data, wherein the acquired interesting data comprises a protocol type information of the next section when the interesting data indication information comprises first indication information that indicates the protocol type information of the next section, wherein the decision result comprises an atomic method of setting a protocol type of the next section when the protocol type information is used as the decision condition, and wherein the protocol type of the next section is a protocol type indicated by the protocol type information.

8. The method according to claim 6, wherein the decision method indicates that different atomic methods are executed according to different decision conditions, wherein the decision condition comprises one or more pieces of interesting data, wherein the acquired interesting data comprises length information of the next section when the interesting data indication information comprises second indication information that indicates length information of the next section, wherein the decision result comprises an atomic method of setting the next section as a section with a preset length directly skipped when the length information is used as the decision condition, and wherein the preset length is a length indicated by the length information.

9. The method according to claim 6, wherein the decision method indicates that different atomic methods are executed according to different decision conditions, wherein the decision condition comprises one or more pieces of interesting data, wherein the acquired interesting data comprises encoding and decoding information of the next section when the interesting data indication information comprises third indication information that indicates the encoding and decoding information of the next section, wherein the decision result comprises an atomic method of setting a decoding algorithm that needs to be performed before the next section is to be parsed when the encoding and decoding information is used as the decision condition, and wherein the decoding algorithm that needs to be performed before the next section is to be processed is the decoding algorithm indicated by the encoding and decoding information.

10. The method according to claim 1, wherein the decision method indicates that different atomic methods are executed according to different decision conditions, wherein the decision condition comprises one or more pieces of the interesting data, and wherein the decision result comprises a parameter required by execution of the following atomic method: setting a decoding algorithm that needs to be performed before the next section is to be processed.

11. The method according to claim 1, wherein the decision method indicates that different atomic methods are executed according to different decision conditions, wherein the decision condition comprises one or more pieces of the interesting data, and wherein the decision result comprises a parameter required by execution of the following atomic method: setting a protocol type of the next section.

12. The method according to claim 1, wherein the decision method indicates that different atomic methods are executed according to different decision conditions, wherein the decision condition comprises one or more pieces of the interesting data, and wherein the decision result comprises a parameter required by execution of the following atomic method: changing a protocol type of a first section of the next message.

13. The method according to claim 1, wherein the interesting data indication information is a label name and the interesting data indicated by the interesting data indication information is a label value.

14. A method for parsing a network message implemented in a network device comprising:
    maintaining configuration files corresponding to different application protocol types;
    receiving a network message, wherein the network message comprises one or more sections;
    identifying that an application protocol type of the network message is a first application protocol;
    acquiring interesting data indicated by an interesting data indication information in a section description information from a current section that is in the network message and that is described by a piece of the section description information in one of the configuration files corresponding to the first application protocol; and
    executing a decision method in the section description information using all or a part of the acquired interesting data as a decision condition to obtain a decision result,
    wherein the decision result comprises a processing method of a next message of the network message when the current section is a last section of the network message,
    wherein both the network message and the next message belong to a same application layer,
    wherein the acquired interesting data comprises a protocol type information of a first section of the next message, length information of the first section of the next message, or encoding and decoding information of a first section of the next message,
    wherein the section description information comprises a section name, a section type, the interesting data indication information, and the decision method,
    wherein the section type indicates a scanning method used by the current section, and
    wherein acquiring interesting data indicated by the interesting data indication information in the section description information comprises:
        obtaining the interesting data indication information by scanning the current section corresponding to the section name using the scanning method indicated by the section type; and
        acquiring the interesting data indicated by the interesting data indication information.

15. The method according to claim 14, wherein the section type indicates a fast scanning method, and wherein obtaining the interesting data indication information by scanning the current section corresponding to the section name using the scanning method indicated by the section type comprises:
    skipping characters of a specific length from a first character of the current section corresponding to the section name;

determining whether n characters, which are not data delimiters and which are behind a skipped-to character and closest to the skipped-to character, are the first n characters in the interesting data indication information when the skipped-to character is a data delimiter;

obtaining the interesting data indication information from the current section according to the first n characters in the interesting data indication information by matching when the n characters are the first n characters in the interesting data indication information, wherein n is greater than or equal to 1;

determining whether a character, which is not in the interesting data indication information and which is before the skipped-to character and closest to the skipped-to character, is the data delimiter when the skipped-to character is a character in the first n characters in the interesting data indication information; and obtaining, by matching, the interesting data indication information from the current section using the skipped-to character when the character, which is not in the interesting data indication information and which is before the skipped-to character and closest to the skipped-to character, is the data delimiter.

16. A computer system, comprising:
an interface;
a memory configured to store configuration files that correspond to different application protocol types; and
a processor coupled to the memory and the interface, wherein the processor is configured to:
  obtain a network message which is received from the interface, wherein the network message comprises one or more sections;
  identify that an application protocol type of the network message is a first application protocol;
  acquire interesting data indicated by an interesting data indication information in a section description information from a current section that is in the network message and that is described by a piece of the section description information in one of the configuration files corresponding to the first application protocol; and
  execute a decision method in the section description information using all or a part of the acquired interesting data as a decision condition to obtain a decision result,
wherein the decision result comprises a processing method of a next message of the network message when the current section is a last section of the network message,
wherein both the network message and the next message belong to a same application layer, and
wherein:
  the acquired interesting data comprises a protocol type information of a first section of the next message, length information of the first section of the next message, or encoding and decoding information of a first section of the next message,
  the interesting data indication information is a header field name and the interesting data indicated by the interesting data indication information is a header field value located behind a corresponding header field,
  the interesting data indication information is the header field name and the interesting data indicated by the interesting data indication information is interesting data indicated by the header field name,
  the interesting data indication information is an attribute name and the interesting data indicated by the interesting data indication information is an attribute value, or
  the interesting data indication information is a label name and the interesting data indicated by the interesting data indication information is a label value.

17. The computer system according to claim 16, wherein the section description information comprises a section name, a section type, the interesting data indication information, and the decision method, wherein the section type indicates a scanning method used by the current section, and wherein in acquiring interesting data indicated by the interesting data indication information in the section description information, the processor is further configured to:
  obtain the interesting data indication information by scanning the current section corresponding to the section name using the scanning method indicated by the section type; and
  acquire the interesting data indicated by the interesting data indication information.

18. The computer system according to claim 17, wherein the section type indicates a fast scanning method, and wherein in obtaining the interesting data indication information by scanning the current section corresponding to the section name using the scanning method indicated by the section type, the processor is further configured to:
  skip characters of a specific length from a first character of the current section corresponding to the section name;
  determine whether n characters, which are not data delimiters and which are behind a skipped-to character and closest to the skipped-to character, are first n characters in the interesting data indication information when the skipped-to character is a data delimiter, wherein the interesting data indication information from the current section according to the first n characters in the interesting data indication information, wherein n is greater than or equal to 1 by matching when the n characters, which are not data delimiters and which are behind the skipped-to character and closest to the skipped-to character, are first n characters in the interesting data indication information; and
  determine whether a character, which is not in the interesting data indication information and which is before the skipped-to character and closest to the skipped-to character, is the data delimiter when the skipped-to character is a character in the first n characters in the interesting data indication information, and wherein the interesting data indication information from the current section using the skipped-to character by matching when the character, which is not in the interesting data indication information and which is before the skipped-to character and closest to the skipped-to character, is the data delimiter.

19. A computer system, comprising:
an interface;
a memory configured to store configuration files that correspond to different application protocol types; and
a processor coupled to the memory and the interface, wherein the processor is configured to:
  obtain a network message which is received from the interface, wherein the network message comprises one or more sections;
  identify that an application protocol type of the network message is a first application protocol;

acquire interesting data indicated by an interesting data indication information in a section description information from a current section that is in the network message and that is described by a piece of the section description information in one of the configuration files corresponding to the first application protocol; and execute a decision method in the section description information using all or a part of the acquired interesting data as a decision condition to obtain a decision result, wherein the decision result comprises a processing method of a next message of the network message when the current section is a last section of the network message, wherein both the network message and the next message belong to a same application layer, wherein the decision method indicates that different atomic methods are executed according to different decision conditions, wherein the decision condition comprises one or more pieces of interesting data, and wherein in acquiring interesting data indicated by the interesting data indication information in the section description information and executing a decision method in the section description information using all or a part of the acquired interesting data as a decision condition, acquire the interesting data indicated by the interesting data indication information in the section description information from the current section that is in the network message and that is described by the section description information in the one of the configuration files corresponding to the first application protocol, wherein the interesting data indication information comprises first indication information that indicates protocol type information of a next section and second indication information that indicates length information of the next section, and wherein the acquired interesting data comprises the protocol type information and the length information; and obtain the decision result using the protocol type information and the length information as the decision condition, wherein the length information indicates that the current section is the last section, wherein the decision result comprises an atomic method of changing a protocol type of a first section of the next message, and wherein the protocol type of the first section of the next message is a protocol type indicated by the protocol type information.

20. A computer system, comprising:
an interface;
a memory configured to store configuration files that correspond to different application protocol types; and
a processor coupled to the memory and the interface, wherein the processor is configured to:
obtain a network message which is received from the interface, wherein the network message comprises one or more sections;
identify that an application protocol type of the network message is a first application protocol;
acquire interesting data indicated by an interesting data indication information in a section description information from a current section that is in the network message and that is described by a piece of the section description information in one of the configuration files corresponding to the first application protocol; and execute a decision method in the section description information using all or a part of the acquired interesting data as a decision condition to obtain a decision result,
wherein the decision result comprises a processing method of a next message of the network message when the current section is a last section of the network message, and
wherein both the network message and the next message belong to a same application layer,
wherein the decision result indicates a processing method of a next section of the current section when the current section is not the last section of the network message,
wherein the decision method indicates that different atomic methods are executed according to different decision conditions, and
wherein the decision condition comprises one or more pieces of interesting data, wherein in acquiring interesting data indicated by the interesting data indication information in the section description information and executing a decision method in the section description information using all or a part of the acquired interesting data as a decision condition, the processor is further configured to:
acquire the interesting data indicated by the interesting data indication information in the section description information from the current section that is in the network message and that is described by the section description information in the one of the configuration files corresponding to the first application protocol, wherein the interesting data indication information comprises second indication information that indicates length information of the next section, and wherein the acquired interesting data comprises the length information; and
obtain the decision result using the length information as the decision condition, wherein the decision result comprises an atomic method of setting the next section as a section with a preset length directly skipped, and wherein the preset length is a length indicated by the length information.

21. A computer system, comprising:
an interface;
a memory configured to store configuration files that correspond to different application protocol types; and
a processor coupled to the memory and the interface, wherein the processor is configured to:
obtain a network message which is received from the interface, wherein the network message comprises one or more sections;
identify that an application protocol type of the network message is a first application protocol;
acquire interesting data indicated by an interesting data indication information in a section description information from a current section that is in the network message and that is described by a piece of the section description information in one of the configuration files corresponding to the first application protocol; and
execute a decision method in the section description information using all or a part of the acquired interesting data as a decision condition to obtain a decision result,
wherein the decision result comprises a processing method of a next message of the network message when the current section is a last section of the network message, wherein both the network message and the next message belong to a same application layer, wherein the decision result indicates a processing method of a next section of the current section when the current section is not the last section of the network message, wherein the decision method indicates that different atomic methods are executed according to different decision conditions, wherein the decision condition comprises one or more pieces of interesting data, and wherein in acquiring interesting data indicated by the interesting data indication information in the section description information and executing a decision method in the section description information using all or a part of the acquired interesting data as a decision condition, the processor is further configured to:

acquire the interesting data indicated by the interesting data indication information in the section description information from the current section that is in the network message and that is described by the section description information in the one of the configuration files corresponding to the first application protocol, wherein the interesting data indication information comprises first indication information that indicates protocol type information of a next section, and wherein the acquired interesting data comprises the protocol type information; and obtain the decision result using the protocol type information as the decision condition, wherein the decision result comprises an atomic method of setting a protocol type of the next section, and wherein the protocol type of the next section is a protocol type indicated by the protocol type information.

22. A parsing system, comprising:

a processor;

a memory coupled to the processor and configured to store configuration files and a program that is used by the processor, wherein the configuration files correspond to different application protocol types;

a compiler coupled to the processor and configured to compile the configuration files into protocol parsing auxiliary data that can be identified by the processor, wherein the processor is configured to:

receive a network message comprising one or more sections;

identify that an application protocol type of the network message is a first application protocol;

acquire interesting data indicated by an interesting data indication information in a section description information from a current section that is in the network message and that is described by a piece of the section description information in protocol parsing auxiliary data corresponding to the first application protocol; and execute a decision method in the section description information using all or a part of the acquired interesting data as a decision condition to obtain a decision result, wherein the decision result comprises a processing method of a next message of the network message when the current section is a last section of the network message, wherein both the network message and the next message belong to a same application layer, and wherein the acquired interesting data comprises a protocol type information of a first section of the next message, length information of the first section of the next message, or encoding and decoding information of a first section of the next message;

a fast scanning compiler coupled to the processor and configured to:

compile the interesting data indication information in each section described in each of the configuration files into machine-readable protocol parsing auxiliary data; and output a fast scanning table comprising a first n characters of the interesting data indication information and protocol parsing auxiliary data corresponding to a data delimiter in the section;

a precise matching compiler coupled to the processor and configured to compile a multi-mode matching algorithm into machine-readable protocol parsing auxiliary data; and a logical decision compiler coupled to the processor and configured to compile the decision method in the configuration files into machine-readable protocol parsing auxiliary data.

23. The system according to claim 22, wherein the configuration files corresponding to the application protocol type comprise one or more pieces of the section description information, wherein the section description information comprises a section name, a section type, the interesting data indication information, and the decision method, wherein the section type indicates a scanning method used by a section, wherein the decision method indicates that different atomic methods are executed according to different decision conditions, wherein the decision condition comprises one or more pieces of the interesting data, wherein the decision result comprises a parameter required by execution of the following atomic method: setting the next section.

24. The system according to claim 22, further comprising a memory manager configured to manage the memory used by the compiler and the processor, wherein different memory areas of the memory are used by the compiler and the processor.

25. The system according to claim 22, further comprising a loader configured to:

read the configuration files from an internal storage device; and load the configuration files into the compiler.

26. The system according to claim 22, wherein the configuration files corresponding to the application protocol type comprise one or more pieces of the section description information, wherein the section description information comprises a section name, a section type, the interesting data indication information, and the decision method, wherein the section type indicates a scanning method used by a section, wherein the decision method indicates that different atomic methods are executed according to different decision conditions, wherein the decision condition comprises one or more pieces of the interesting data, wherein the decision result comprises a parameter required by execution of the following atomic method: changing a protocol type of a first section of the next message.

27. The system according to claim 22, wherein the processor is further configured to:

skip characters of a specific length from a first character of the current section corresponding to a section name;

determine whether a skipped-to character is a data delimiter or a character in the first n characters in the interesting data indication information according to the fast scanning table;

determine whether n characters, which are not data delimiters and which are behind the skipped-to character and closest to the skipped-to character, are the first n characters in the interesting data indication information when the skipped-to character is the data delimiter;

determine whether a character, which is not in the interesting data indication information and which is before the skipped-to character and closest to the skipped-to character, is the data delimiter when the skipped-to character is the character in the first n characters in the interesting data indication information, wherein n is greater than or equal to 1;

execute the compiled multi-mode matching algorithm in the protocol parsing auxiliary data according to the first n characters in the interesting data indication information to obtain the interesting data indication information in the current section by matching when the n characters, which are not data delimiters and which are behind the skipped-to character and closest to the skipped-to character, are the first n characters in the interesting data indication information;

execute the compiled multi-mode matching algorithm in the protocol parsing auxiliary data using the skipped-to character to obtain the interesting data indication information in the current section by matching when the character, which is not in the interesting data indication information and which is before the skipped-to character and closest to the skipped-to character, is the data delimiter, acquire the interesting data indicated by the interesting data indication information according to the interesting data indication information obtained by matching, and execute the decision method in the section description information in the protocol parsing auxiliary data using all or a part of the interesting data to obtain the decision result.

28. The system according to claim 22, wherein the processor is configured to output the acquired interesting data to outside.

29. The system according to claim 22, wherein the configuration files corresponding to the application protocol type comprise one or more pieces of the section description information, wherein the section description information comprises a section name, a section type, the interesting data indication information, and the decision method, wherein the section type indicates a scanning method used by a section, wherein the decision method indicates that different atomic methods are executed according to different decision conditions, wherein the decision condition comprises one or more pieces of the interesting data, wherein the decision result comprises a parameter required by execution of the following atomic method: setting a protocol type of the next section.

30. The system according to claim 22, wherein the configuration files corresponding to the application protocol type comprise one or more pieces of the section description information, wherein the section description information comprises a section name, a section type, the interesting data indication information, and the decision method, wherein the section type indicates a scanning method used by a section, wherein the decision method indicates that different atomic methods are executed according to different decision conditions, wherein the decision condition comprises one or more pieces of the interesting data, wherein the decision result comprises a parameter required by execution of the following atomic method: setting a decoding algorithm that needs to be performed before the next section is to be processed.

31. The system according to claim 22, further comprising a loader configured to:

read the configuration files from an external storage device; and load the configuration files into the compiler.

32. A computer system comprising:

an interface;

a memory configured to store configuration files that correspond to different application protocol types; and a processor coupled to the memory and the interface, wherein the processor is configured to:

obtain a network message which is received from the interface, wherein the network message comprises one or more sections;

identify that an application protocol type of the network message is a first application protocol;

acquire interesting data indicated by an interesting data indication information in a section description information from a current section that is in the network message and that is described by a piece of the section description information in one of the configuration files corresponding to the first application protocol; and execute a decision method in the section description information using all or a part of the acquired interesting data as a decision condition to obtain a decision result, wherein the decision result comprises a processing method of a next message of the network message when the current section is a last section of the network message, wherein both the network message and the next message belong to a same application layer, wherein the decision method indicates that different atomic methods are executed according to different decision conditions, wherein the decision condition comprises one or more pieces of interesting data, and wherein in acquiring interesting data indicated by the interesting data indication information in the section description information and executing a decision method in the section description information using all or a part of the acquired interesting data as a decision condition, the processor is further configured to:

acquire the interesting data indicated by the interesting data indication information in the section description information from the current section that is in the network message and that is described by the section description information in the one of the configuration files corresponding to the first application protocol, wherein the interesting data indication information comprises first indication information that indicates protocol type information of a next section, and wherein the acquired interesting data comprises the protocol type information; and obtain the decision result using the protocol type information as the decision condition, wherein the decision result comprises an atomic method of changing a protocol type of a first section of the next message, and wherein the protocol type of the first section of the next message is a protocol type indicated by the protocol type information.

33. A computer system, comprising:

an interface;

a memory configured to store configuration files that correspond to different application protocol types; and a processor coupled to the memory and the interface, wherein the processor is configured to:
- obtain a network message which is received from the interface, wherein the network message comprises one or more sections;
- identify that an application protocol type of the network message is a first application protocol;
- acquire interesting data indicated by an interesting data indication information in a section description information from a current section that is in the network message and that is described by a piece of the section description information in one of the configuration files corresponding to the first application protocol; and
- execute a decision method in the section description information using all or a part of the acquired interesting data as a decision condition to obtain a decision result, wherein the decision result comprises a processing method of a next message of the network message when the current section is a last section of the network message, wherein both the network message and the next message belong to a same application layer, wherein the decision result indicates a processing method of a next section of the current section when the current section is not the last section of the network message, wherein the decision method indicates that different atomic methods are executed according to different decision conditions, wherein the decision condition comprises one or more pieces of interesting data, and wherein in acquiring interesting data indicated by the interesting data indication information in the section description information and executing a decision method in the section description information using all or a part of the acquired interesting data as a decision condition the processor is further configured to:
- acquire the interesting data indicated by the interesting data indication information in the section description information from the current section that is in the network message and that is described by the section description information in the one of the configuration files corresponding to the first application protocol, wherein the interesting data indication information comprises third indication information that indicates encoding and decoding information of the next section, and wherein the acquired interesting data comprises the encoding and decoding information; and
- obtain the decision result using the encoding and decoding information as the decision condition, wherein the decision result comprises an atomic method of setting a decoding algorithm that needs to be performed before the next section is to be processed, and wherein the decoding algorithm that needs to be performed before the next section is to be processed is the decoding algorithm indicated by the encoding and decoding information.

* * * * *